(12) United States Patent
Osman et al.

(10) Patent No.: US 10,657,701 B2
(45) Date of Patent: May 19, 2020

(54) DYNAMIC ENTERING AND LEAVING OF VIRTUAL-REALITY ENVIRONMENTS NAVIGATED BY DIFFERENT HMD USERS

(71) Applicant: Sony Interactive Entertainment Inc., Tokyo (JP)

(72) Inventors: Steven Osman, San Francisco, CA (US); Javier Fernandez Rico, Pacifica, CA (US); Ruxin Chen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 82 days.

(21) Appl. No.: 15/404,074

(22) Filed: Jan. 11, 2017

(65) Prior Publication Data

US 2018/0005429 A1 Jan. 4, 2018

Related U.S. Application Data

(60) Provisional application No. 62/357,330, filed on Jun. 30, 2016.

(51) Int. Cl.
*G06T 15/20* (2011.01)
*G06F 1/16* (2006.01)
(Continued)

(52) U.S. Cl.
CPC ............. *G06T 15/20* (2013.01); *A63F 13/25* (2014.09); *A63F 13/48* (2014.09); *A63F 13/5255* (2014.09); *A63F 13/56* (2014.09); *A63F 13/795* (2014.09); *A63F 13/847* (2014.09); *G02B 27/017* (2013.01); *G02B 27/0172* (2013.01); *G06F 1/163* (2013.01);

*G06F 3/011* (2013.01); *G06F 3/012* (2013.01); *G06F 3/013* (2013.01); *G06F 3/0304* (2013.01); *G06T 7/70* (2017.01);
(Continued)

(58) Field of Classification Search
CPC .......... G06T 15/20; G06F 1/163; A63F 13/56; G02B 27/017
See application file for complete search history.

(56) References Cited

U.S. PATENT DOCUMENTS 9,310,883 B2\* 4/2016 Weising .................. G06F 3/017
2008/0146343 A1 6/2008 Sullivan et al.
(Continued)

OTHER PUBLICATIONS

ISR PCT/US2017/039599, dated Sep. 26, 2017, 4 pages.
(Continued)

*Primary Examiner* — Hilina K Demeter
(74) *Attorney, Agent, or Firm* — Penilla IP, APC

(57) ABSTRACT

Systems and methods for processing operations for head mounted display (HMD) users to join virtual reality (VR) scenes are provided. A computer-implemented method includes providing a first perspective of a VR scene to a first HMD of a first user and receiving an indication that a second user is requesting to join the VR scene provided to the first HMD. The method further includes obtaining real-world position and orientation data of the second HMD relative to the first HMD and then providing, based on said data, a second perspective of the VR scene. The method also provides that the first and second perspectives are each controlled by respective position and orientation changes while viewing the VR scene.

20 Claims, 16 Drawing Sheets

(51) Int. Cl.

| | | |
|---|---|---|
| *A63F 13/847* | (2014.01) | |
| *A63F 13/48* | (2014.01) | |
| *A63F 13/795* | (2014.01) | |
| *A63F 13/5255* | (2014.01) | |
| *A63F 13/25* | (2014.01) | |
| *A63F 13/56* | (2014.01) | |
| *G02B 27/01* | (2006.01) | |
| *G06F 3/01* | (2006.01) | |
| *G06T 7/70* | (2017.01) | |
| *G06F 3/03* | (2006.01) | |
| *G06T 13/40* | (2011.01) | |
| *G06T 19/00* | (2011.01) | |
| *G02B 27/00* | (2006.01) | |
| *A63F 13/26* | (2014.01) | |
| *A63F 13/21* | (2014.01) | |
| *A63F 13/86* | (2014.01) | |

(52) U.S. Cl.
CPC ............ *G06T 13/40* (2013.01); *G06T 19/006* (2013.01); *A63F 13/21* (2014.09); *A63F 13/26* (2014.09); *A63F 13/86* (2014.09); *A63F 2300/105* (2013.01); *A63F 2300/8082* (2013.01); *G02B 27/0093* (2013.01); *G02B 2027/014* (2013.01); *G02B 2027/0138* (2013.01); *G06T 2215/16* (2013.01); *G06T 2219/024* (2013.01)

(56) References Cited

U.S. PATENT DOCUMENTS

| | | | |
|---|---|---|---|
| 2012/0249741 A1* | 10/2012 | Maciocci | G06F 3/017 348/46 |
| 2014/0179428 A1 | 6/2014 | Miura et al. | |
| 2015/0269780 A1 | 9/2015 | Herman et al. | |
| 2015/0348327 A1* | 12/2015 | Zalewski | G06F 3/01 345/419 |
| 2016/0093108 A1* | 3/2016 | Mao | A63F 13/42 345/633 |
| 2016/0343167 A1* | 11/2016 | Herman | G06T 19/006 |
| 2016/0350973 A1* | 12/2016 | Shapira | G06F 3/011 |

OTHER PUBLICATIONS

Salzmann et al, The Two-User Seating Buck: Enabling Face-to-Face Discussions of Novel Car Interface Concepts, IEEE Virtual Reality Mar. 8-12, 2008, Reno, Nevada USA, pp. 75-82.

* cited by examiner

DYNAMIC ENTERING AND LEAVING OF VIRTUAL-REALITY ENVIRONMENTS NAVIGATED BY DIFFERENT HMD USERS

CLAIM OF PRIORITY

This application is a non-provisional of U.S. Provisional Patent Application No. 62/357,330, filed on Jun. 30, 2016, entitled "Dynamic Entering And Leaving of Virtual-Reality Environments Navigated by Different HMD Users," which is herein incorporated by reference.

FIELD OF THE DISCLOSURE

The present disclosure relates to virtual reality (VR) environment content presented in head mounted displays (HMDs), and methods and system for allowing an HMD user to dynamically enter and leave a VR environment of a different HMD user and methods for allowing virtual interaction between two HMD users within the VR environment.

BACKGROUND

Virtual reality (VR) presented through head mounted displays (HMDs) are becoming a more and more popular way for consumers to interact with content. However, while much of the computer entertainment industry has seen a shift toward offering more social and inter-personal platforms of interacting with content, VR has been a notable exception. Indeed, VR users often find that virtual environments can be isolating and lacking in a social aspect. As VR continues to gain popularity, there is an opportunity to incorporate social and inter-personal components to enhance and humanize the VR consumer experience.

This is especially true when HMD users are co-located. For example, two co-located HMD users each within their own VR may wish to share their VR with the other and otherwise interact with one another within the VR environment. That is, there is an opportunity to not only enable co-located users to witness the same VR, but also to allow for the interaction between the avatars of the co-located users within a VR environment. Such inter-personal and "inter-avatar" interaction enhances the VR experience for users and allows content creators to incorporate social and multi-user dimensions into the VR content universe.

It is in this context that embodiments of the disclosure arise.

SUMMARY

Embodiments of the present disclosure provide methods and systems for sharing a virtual reality environment, and more particularly for allowing a guest HMD user to join a virtual reality environment (or simply virtual reality) of a host HMD user. The method and system also define embodiments for the first and second user to interact virtually within the virtual reality (VR) environment of the host user once the guest has joined. It should be appreciated that the present disclosure can be implemented in numerous ways, such as a process, an apparatus, a system, a device or a method on a computer readable medium. Several inventive embodiments of the present disclosure are described below.

In one embodiment, a computer implemented method includes processing operations for head mounted display (HMD) users to join virtual reality (VR) scenes. The method includes providing a first perspective of a VR scene to a first HMD of a first user, and then receiving an indication that the second user of a second HMD is requesting to join the VR scene provided to the first HMD. Further, the method includes obtaining real-world position and orientation data of the second HMD relative to the first HMD and then providing, based on the real world position and orientation data of the second perspective of the VR scene in response to the request to join the VR scene by the second user. Furthermore, the method provides that the first perspective and the second perspective of the VR scene are each controlled by respective position and orientation changes while viewing the VR scene.

In another embodiment, a system for providing VR scenes to one or more HMDs includes a first HMD configured to display VR scenes to a user, as well as a computing system capable of executing VR content, which produces a first perspective of a VR scene. The computing system also establishes a first communication channel for providing the first perspective of the VR scene to the first HMD as well as w second communication channel for receiving a signal from a second HMD requesting to join the VR scene. The second communication channel is also used to provide a second perspective of the VR scene to the second HMD. The system additionally includes a positioning system for tracking real-world position and orientation and changes thereto of the first HMD and the second HMD. According to this embodiment, the second perspective of the VR scene is based on the real world position and orientation of the second HMD relative to that of the first HMD, while each of the first and second perspectives are controlled by respective position and orientation changes of the first and second HMDs.

In a further embodiment, a system for providing VR scenes is described that includes a first HMD configured to display a first perspective of a VR scene to a first user as well as a mobile computing device associated with the first HMD usable for executing VR content to produce a first perspective of the VR scene. The mobile computing system also includes a communication channel for exchanging data with a second HMD that is operable to enable the second HMD to display a second perspective of the VR scene to a second user, wherein the second perspective is different than the first perspective. Additionally, the mobile computing device includes an inertial sensor for tracking real-world position and orientation of the first HMD. According to this embodiment, the second perspective of the VR scene is based on real-world position and orientation of the second HMD relative to the first HMD. In certain embodiments, the mobile computing device may include one of a smart phone, a tablet, a laptop, or a netbook.

In one embodiment, a method includes an operation for sending an invitation from a host HMD user to a guest HMD user to join a virtual reality. The method includes operations to determine the position and orientation of the guest via cameras and inertial sensors in and on the HMDs and additional cameras within the virtual reality interactive space. Further, the method includes an operation to introduce a virtual representation, or avatar, of the second user into the VR appearing at a virtual position and orientation to the host corresponding to the guest's real-world position and orientation relative to the guest. Additionally, the method includes operations to display to the guest the VR with a modified perspective corresponding to the second user's position and orientation relative to the host. Further, the method may track real world movements of both users and map them into virtual movements in real-time. Thus, the two users are able to interact via their avatars (inter-avatar interaction) such that communication, interaction, and viewing within the shared virtual reality environment can be perceived by the users as if it were an inter-personal interaction occurring in the real world.

In another embodiment, a system for allowing a guest HMD user to join a VR of a host HMD user is provided. The system initiates a joining of the second HMD user to the VR by determining the relative positions and orientation of both users and inserts the guest into the VR at a position and orientation that corresponds to the guest's position and orientation in the real world relative to the host. The system may also obtain gaze data from both users and process said gaze data to determine a point of gaze (POG) for both users. Additionally, the system may present an indication of the POG of the second user within the host's VR, and an indication of the host's POG within the second user's VR. For example, a reticle or crosshairs animation may be used to indicate a POG to the other user. In some embodiments, a ghosted trail may be displayed to the other HMD user to show the content that the user is looking at and gazing at over time. This way, the other HMD user can track and follow what the other HMD user is looking at. Embodiments of this type of functionality are especially useful in multiuser games or in environments where the shared virtual environment will be experienced by two or more HMD users.

In another embodiment, a computer program embedded in a non-transitory computer-readable medium, when executed by one or more processors, allows for the joining of a guest HMD user to the VR of a host HMD user. Included in the medium are program instructions for obtaining position and orientation data on both HMD users, which is used to determine where and with what perspective the second HMD user is to join the VR. The medium also includes program instructions for tracking real world movements of each user and mapping them to movements of the user's avatar. As a result, users can communicate, interact, and view the shared VR environment with one another as if those communications, interactions and viewing were occurring in the real world. Further aspects of the embodiment include program instructions for tracking gaze data, so that that each of the HMD users can see or focus on what the other HMD users are looking at. For instance, if one user is looking at a table in the VR environment, that table can be identified as being the subject that the HMD user is looking at by using gaze detection data. This gaze detection signal can then be communicated to the other HMD user so that the other HMD user can also look at the same thing, e.g. the table. This way, the 2 HMD users can share or communicate information regarding what each of the users is looking at within the shared virtual environment.

In a further embodiment, a method includes detecting a gaze direction of an HMD user and rendering the appearance of a pair of eyes of an avatar of the HMD user to have the same gaze direction of the HMD user in the real world. In certain embodiments, constantly tracking a second user's POG via a reticle is undesirable because of a frequency of changes in the POG. Therefore, in certain embodiments, a first user's gaze direction may be estimated by a second user by looking at the first user's avatar, and particularly the eyes of first user's avatar.

Other aspects of the disclosure will become apparent from the following detailed description, taken in conjunction with the accompanying drawings, illustrating by way of example the principles of the inventio

BRIEF DESCRIPTION OF THE DRAWINGS

The disclosure may best be understood by reference to the following description taken in conjunction with the accompanying drawings in which.

DETAILED DESCRIPTION

Figure 1:
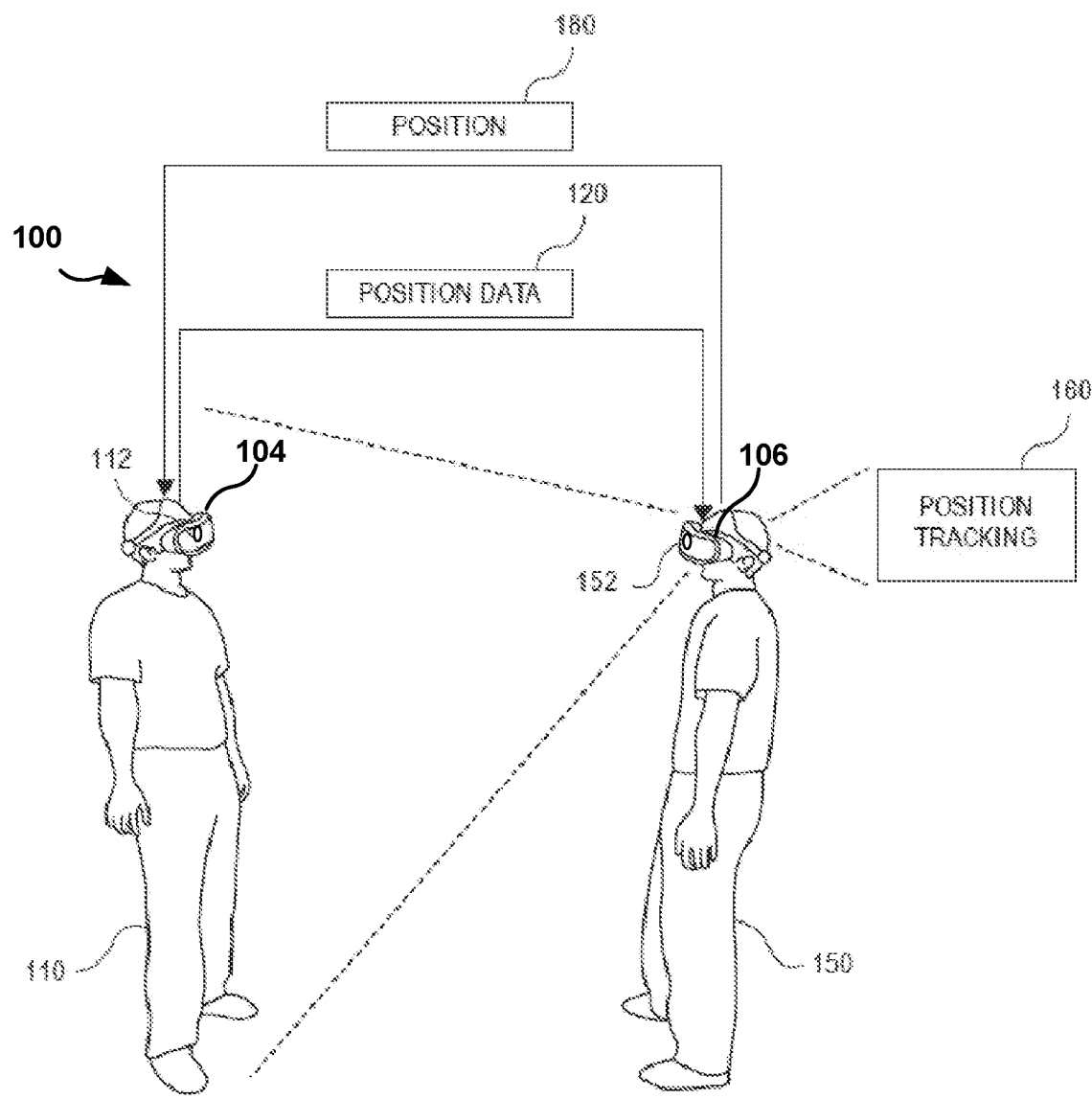
FIG. 1 shows an embodiment of a virtual reality interactive space where position data of two co-located HMD users are being mutually tracked.

The following embodiments describe methods, computer programs, and apparatus for enabling two or more co-located head mounted display (HMD) users to dynamically enter into and leave a shared virtual reality as well as interact within the shared VR via the users' respective avatars. It will be obvious, however, to one skilled in the art, that the present disclosure may be practiced without some or all of these specific details. In other instances, well known process operations have not been described in detail in order not to unnecessarily obscure the present disclosure.

VR environments are typically configured to be navigable by a single user at a time via an HMD and/or one or more controllers. This is largely due to the nature of HMDs and their capacity to provide VR for only a single person at a time. Thus, when two or more HMD users are co-located in the real world, they may be immersed in different virtual reality environments and completely unaware of one another's experiences.

Meanwhile, the computer entertainment industry has experienced a sea change to become more and more social, cooperative, and shareable. VR environments delivered through HMDs, however, have been the notable exception. Indeed, HMD users often find that VR, while entertaining, becomes extremely isolating due to lacking a social dimensionality. As a result, users often sacrifice social interaction for immersive entertainment and vice versa. Consequently, there is an opportunity to introduce a social, cooperative and shareable component to VR environments provided by HMDs to make them less isolating, more communal, and more entertaining overall.

This is especially the case when two HMD users are co-located but experiencing completely different VR environments. For example, a host may wish to share his VR with a second user, while the second user may wish to see what the host is seeing. According to one embodiment of the present disclosure, the host may be provided with the option of inviting the second player to join his VR. Inviting other users to join may be triggered in a number of ways, including via voice command, a VR command, a share button, or some other virtual command.

Once triggered, the invitation might then be delivered to the guest. The delivery of the invitation between host and guest may occur in a number of ways, for example via local area network (LAN), WiFi, near-field communication (NFC), Bluetooth, or other suitable connection vehicle. The guest might receive his invitation in one or a number of ways. For example, the invitation might be conveyed via voice, via a VR 'assistant' displayed by the HMD, an animation displayed by the HMD, a text block displayed by the HMD, or other suitable form of communication.

In general, HMD's providing a VR to a user typically has a "halo" associated with it. The halo represents a three dimensional space that at any given moment the user may be expected to physically move about and/or gesture within as dictated by the VR. Halos may take on one of many shapes and sizes depending on the user and the VR currently being displayed. For example, a halo of a VR requiring a user to sit and remain still might be smaller in size than a halo of a VR of a tennis match requiring the user to move his or her feet and while swinging a racquet. In practice, halos can represent spaces that a user is free to interact with his or her VR without obstruction from objects in the immediate surrounding. Additionally, halos may be used by one or more VR delivery systems to gauge a separation distance between two co-located HMD users and automatically initiate the process of joining a guest and a host into a shared VR. For example, if co-located HMD users are unaware of a position of the others, the VR delivery system or method might detect that two or more halos are too close or overlapping and warn the users of the proximity of the other. In certain embodiments, the VR delivery system or method might have a second user ("guest") join the VR of a first user ("host"). In these embodiments, the host is allowed to progress in his VR while both host and guest are given a sense of the distance separating the two and an opportunity to reposition. According to these embodiments, the guest may be given a choice between staying in the VR of the host or repositioning himself such that there is no overlap between respective halos.

Once the guest is in receipt of the invitation, he might accept the invitation to join the host's VR verbally, via a virtual confirmation button, via a physical button on a controller or the HMD, via gesture, or via gaze directionality. According to some embodiments, the guest may then be inserted into the VR environment of the host at a virtual location and having an orientation which corresponds to his real-world location and orientation relative to the host. For example, if the guest happens to be at a 2'O-clock position 5 meters away, he might appear in the VR of the host 5 meters away and 60 degrees from the host's center line of vision.

According to some embodiments, the guest HMD will now be displayed with a VR similar but not identical to that of the host. Because the host and the guest have different perspectives (e.g. vantage points) in the real world, they will also have different virtual perspectives of the VR. For example, if the host is facing due north while the guest is facing westerly, the two will be displayed views that differ by 90 degrees. Furthermore, because of their separation in real world space, the host and the guest may be displayed different perspectives of the VR even if they were to face the same direction.

In certain embodiments, the real-time, real-world movements of the host and the guest are mapped onto VR space. These real-time, real-world movements may be detected in a number of ways, including by example being captured by cameras on the HMDs and additional cameras in the virtual reality interactive space, inertial sensors in the HMDs and/or controllers, among others. In this way, the host may see an avatar of the guest move within the VR as he would in the real-world and vice versa. For example, if the host waves "hello" at the guest, the movements of his arm and hand are captured and mapped onto virtual space. The guest is able to see the waving gesture of the host avatar within the VR. The guest may choose to wave back, which would likewise be mapped into virtual space for the host to see. This type of inter-avatar interaction allows for a more social and interpersonal modality of VR.

As used herein, "virtual reality interactive space" refers to the 3-dimensional real-world space in which one or more users may be engaged in a VR via an HMD. Additionally, as used herein, "mapping onto VR space" refers to the detection, computational and graphical process of translating a physical object (and its motion) existing in the real world into a corresponding virtual representation of the physical object (and its motion) to be rendered in virtual reality space, according to mapping rules.

In addition to allowing HMD users to see the movements of one another, certain embodiments may also allow HMD users to see where and what other users are gazing at or looking at. In these embodiments, gaze of both host and guest is tracked via a gaze detection module. Gaze data may then be analyzed by a computer to determine what a particular user may be looking at. Gaze data may also be mapped onto virtual space by projecting a virtual indication (e.g. reticle or gaze indicator) of where a user is looking. For example, a host may learn of what a guest is looking at by finding the guest's gaze indicator within the VR Likewise, the guest may be interested in what the host is looking at and may learn of it by tracking the host's gaze indicator within the VR.

In certain other embodiments, HMD users are able to communicate gaze by simply looking or glancing at the avatar of the other user. In these embodiments, a first user's direction of gaze as imaged from the first user's eyes is mapped to a set of eyes of the first user's avatar. That is, the avatar is rendered in a manner to appear to have a direction of gaze to be similar to that of the user's real-world direction of gaze. Accordingly, other users may glean the first user's direction of gaze by looking at the avatar of the first user instead of or in addition to a gaze indicator. Further embodiments allow for host and guest to communicate directly via voice or via controller.

At some point, the guest may wish to leave the host's VR and may do so via voice command, controller button, gesture, gaze, or other command. The guest may then be placed back into his VR at a time and location corresponding to that in which he left to join the host's VR. After returning to his VR, the former guest may wish to host the former host to join his VR. Thus, embodiments of the present disclosure provide for dynamic entering and leaving of one VR environment or scene for another navigated by different HMD users.

In still other embodiments, HMD users are not required to be co-located. That is, the host and guest HMD users may be separated in space. Even though the two HMD users are not located in the same room, the principles of dynamically entering and leaving of a shared VR scene apply just as much. For example, an HMD user in Cupertino, Calif. may wish to join a VR scene being displayed to an HMD user in Ithaca, N.Y. The HMD user in Cupertino (guest) may be joined into VR scene of the HMD user in Ithaca (Host) after a request is sent to Ithaca. In the case of remote VR scene sharing, position and orientation data on both users is used to determine what perspective to give either user, much the same as if the two HMD users were co-located.

However, instead of using a detected relative distance between the Cupertino user and the Ithaca user to determine an insertion point for the Cupertino user into the VR scene, in some embodiments, a predetermined virtual position may be used to insert or introduce the guest into the host's VR scene. In other embodiments, the guest may be enabled to choose a virtual position relative to that of the host to be inserted or introduced into the VR scene. Once the guest is inserted or introduced into the VR scene of the host, the guest may then be tethered to the host, according to certain embodiments.

According to these embodiments, an HMD user is tethered to another HMD user because typically a single HMD user is in control of the VR scene insofar as said HMD user is controlling progression within the VR scene and interactive content contained therein. In these embodiments, the host HMD user is typically designated as the controller (of progression within the VR scene), whereas the guest is typically designated as a spectator. In certain other embodiments, for example, the host and guest may switch roles such that the guest is the controller of the VR scene and the host is a spectator. This may be the case, according to these embodiments, when the controller needs assistance with a task within the game, and the spectator may assume the controller role to help with the task.

'Spectator,' as used herein, is taken to denote a role within the VR scene that is not the controller of the VR scene. It should be noted that 'spectator,' as used here, is not meant to confine the role to only spectating. Thus, a spectator within a VR scene, although not controlling the overall progression of the scene, may still participate and interact within the scene as well as with the controller of the scene. For example, in some embodiments, a spectator may assist the controller by interacting with content within the VR scene, such as helping to solve a puzzle or defeating an enemy. In other embodiments, the spectator may cooperate with the controller to make progress within the VR scene by, for example, passing or handing a virtual item to the controller to use.

'Tethered,' as used herein, is taken to describe the virtual relationship between the controller and the spectator within the VR scene. Specifically, the spectator is tethered to the controller insofar as the VR scene displayed to the spectator depends upon the actions of the controller. For example, if the controller is directing movement within the VR scene by walking toward a point of interest within the VR scene, the spectator will need to follow the controller to remain within the VR scene. If the spectator does not manage to stay within a predetermined proximity of the controller, the spectator may then initiate a leaving of the VR scene. However, the spectator may re-enter the VR scene by localizing within the certain proximity of the controller, according to some embodiments. As a result, the guest or spectator may dynamically enter and leave the VR scene, without affecting progression within the VR scene.

As used herein, 'progression' within the VR scene is taken to mean, generally, interacting with content in the VR scene by an HMD user, which may include, as non-limiting examples, completing a task within the VR scene, directing a movement within the VR scene, solving a puzzle within the VR scene, defeating an enemy within the VR scene, interacting with a non-player character (NPC) within the VR scene, interacting with a player character within the VR scene, scoring points within the VR scene, reaching a higher level within the VR scene, and obtaining an virtual asset within the VR scene.

FIG. 1 shows an embodiment of a virtual reality (VR) interactive space 100. A first user 150 is shown to wear a first HMD 106 and a second user 110 is shown to wear a second HMD 104. HMDs 104 and 106 are connected to one another via wireless and/or wired connection modalities, for example via LAN, WAN, NFC, Bluetooth, WiFi, cellular, the internet, etc. HMD 104 is shown to have a front facing camera 112 and HMD 106 is shown to have a front facing camera 152. Although not shown, both HMDs 104 and 106 may have additional cameras surrounding the body of the HMD 104 or 106 to produce a 360 degree view of the real world.

The position of HMD 106 is shown to be tracked by position tracking 160. This position tracking data is being communicated 180 with HMD 104. Likewise, position data of HMD 104 is being communicated 120 with HMD 106. As a result, HMD 104 is tracking is own position and that of HMD 106 in real-time and HMD 106 is tracking its own position and that of HMD 104 in real-time.

Although not shown in FIG. 1, a computing system that executes VR content to be displayed by the HMDs may, in some embodiments, be one or more separate unit from the HMDs located within the same space as the HMDs. In these embodiments, there may be, for example, a single computing system unit supplying both HMDs with VR content. In other embodiments, each HMD may have a designated computing system unit wherein the computing system units exchange data to synchronize VR content supplied to the HMDs. In these embodiments, the HMDs may be either be connected to the computing unit via a wired connection or a wireless connection.

In still other embodiments, the computing system may be integral to the HMD for both computing and display purposes. That is, the computing system may be configured fit on or in the HMD such that it may provide a display for VR content to the HMD user as well as perform execution of VR content for producing a VR scene. For example, as mentioned above, the computing system may comprise of a mobile phone, or a tablet, or a laptop, or a netbook.

Figure 2:
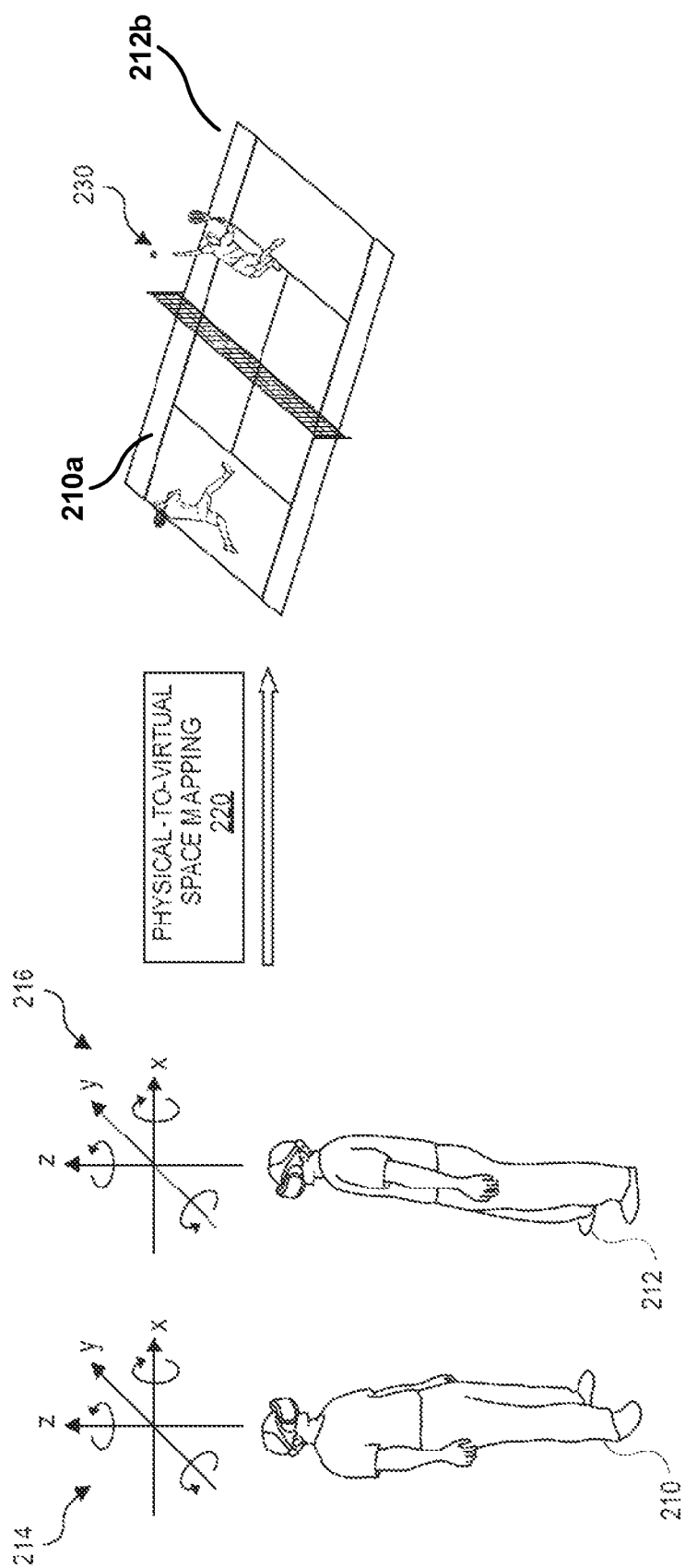
FIG. 2 illustrates a method of mapping from physical space to virtual reality space.

FIG. 2 conceptually illustrates a process of physical-to-virtual space mapping. Users 210 and user 212 are shown to be wearing HMDs while being presented a shared VR. Each HMD has at least six degrees of freedom, as shown by graphical representations 214 and 216. The 6 degrees of freedom, as represented by 214 and 216 include 'forwardback,' up-down,"right-left," roll, pitch, and yaw. In certain embodiments, all 6 degrees of freedom are being tracked by cameras disposed within the virtual reality interactive space and/or by sensors located on and in the HMDs such as inertial sensors. In other embodiments, said degrees of freedom may be tracked by a system including infrared (IR) emitters located within the VR interactive space and photosensitive diodes (PSDs) located on the HMDs.

According to some embodiments, tracking this data and processing it via a computer (not shown) allows for physical-to-virtual space mapping 220. The result of this processing is a virtual space 230 and avatars 210b and 212b that correspond to real world states such as user movement of users 210 and 212, respectively. For example, user 210 is able to see user avatar 212b of user 212 within the shared VR. Likewise, user 212 is able to see user avatar 210a of user 210 within the shared VR. Movements of both users are also being tracked by cameras disposed within the virtual reality interactive space such that movements occurring in the real-world can be mapped into virtual movements carried out by avatars 210a and 212b.

Figure 3:
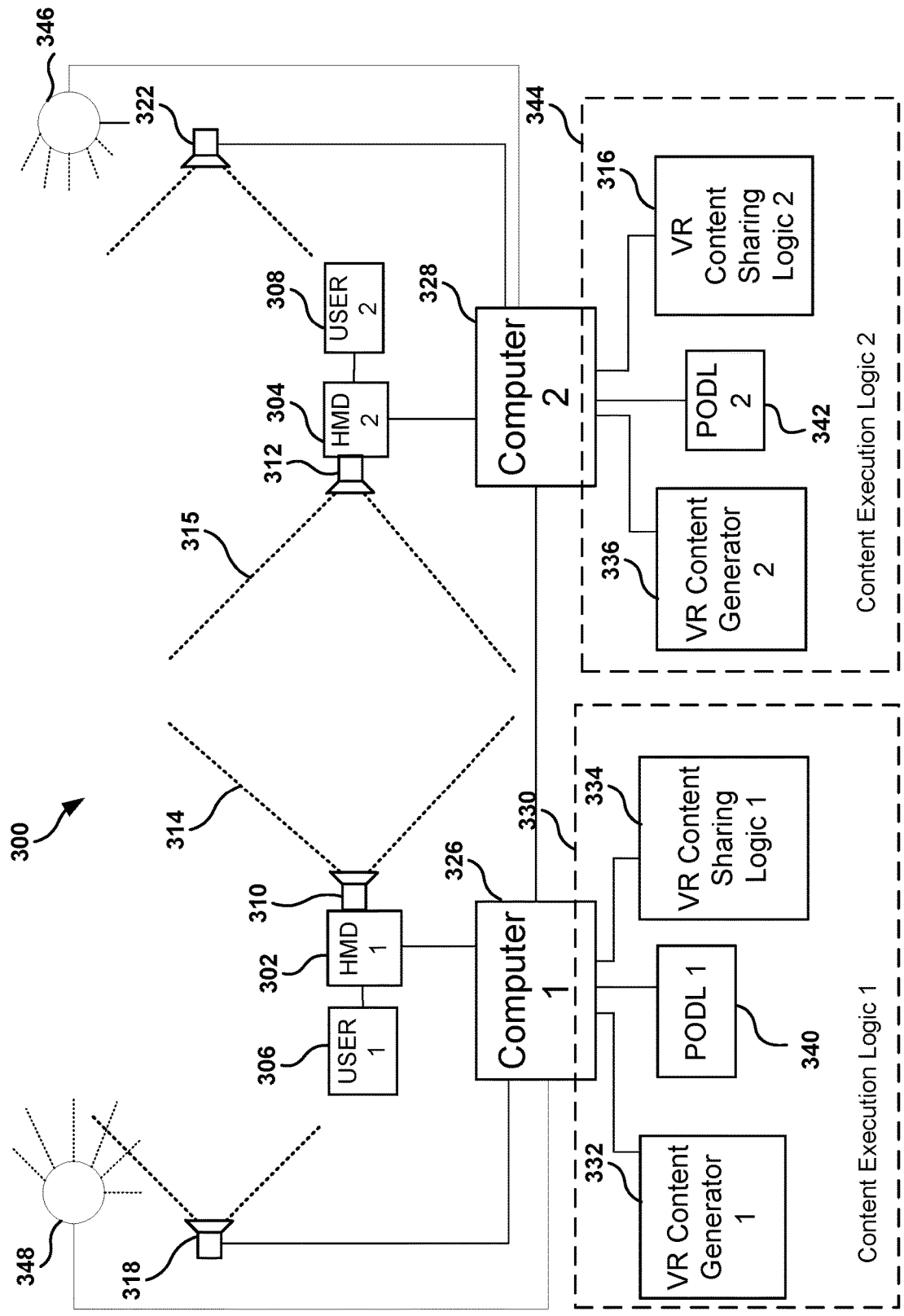
FIG. 3 shows an embodiment of a system capable of allowing dynamic entering and leaving of virtual reality environments.

FIG. 3 shows an embodiment of a system 300 that is able to provide for a dynamic entering and leaving of virtual reality environments. A first user 306 is shown to be connected to a first HMD 302, which in turn is connected to a first computer 326. As second user 308 is shown to be connected to a second HMD 304, which in turn is connected to a second computer 328. Both the first HMD 302 and the second HMD 304 is shown to have FFCs 310 and 312 mounted to them, respectively. In the present embodiment, the first FFC 310 is shown to have a field of view 314 that may capture the second user 308 HMD 304. Likewise, in the present embodiment, the second FFC 312 is shown to have a field of view 315 that may capture the first user 306 and first HMD 302.

First computer 326 is shown to have a content execution logic (CEL) 330, which is responsible for deciding what content to display on the first HMD 302, according to the embodiment shown. CEL 330 is shown to encompass a VR content generator 332, a VR content sharing logic 334, and position-orientation detection logic (PODL) 340. CEL 330 may use VR content generator 332 to provide the first HMD 302 with a VR scene. In some embodiments, the VR scene provided may include a virtual reality game, a virtual reality motion picture, a virtual reality sports game, a virtual reality product demo, or a virtual reality teleconference. In certain other embodiments, the VR may include streaming video of gaming, "play-throughs" of video games, broadcasts of "esports," and other gaming content. In still further embodiments, VR scenes may comprise of creative content such as virtual reality concerts, art shows, music performances, dance performances, theatre, and musicals, among other kinds of creative content. Additional embodiments may have VR scenes comprising of content related to education, job training, military applications, cognitive behavioral therapy (CBT), do-it-yourself (DIY), tourism, real-estate tours, law enforcement, security, and surveillance, among others.

The second computer 328 is shown to have a content execution logic (CEL) 344 that includes a VR content generator 336, a PODL 342, and a VR content sharing logic 316. Additionally, computer 328, is connected to HMD 304, to which a second user 308 interface with. Images captured by camera 312 are relayed to computer 328, as are images captured by camera 322. A connection between computers 326 and 328 is also shown.

The VR content sharing logic 334, in certain embodiments, is able to share the VR content being generated by VR content generator 332 with a second user 308, for example, via the second HMD 304. In certain embodiments, the VR content sharing logic 334 is able to take VR content generated by VR content generator 332, perform content modification, and then present it to the second HMD 304 via the second computer 328 or directly (not shown). According to this embodiment, content modification includes changing the perspective of a VR scene for the second user 308, as well as rendering an avatar of the first user 306 to appear in the VR scene of the second user 308.

According to these embodiments, VR content sharing logic 334 receives input from PODL 340 for modifying the perspective of a VR scene provided by VR content generator 332. PODL 340 provides data on the position and orientation of the second user 308 and the second HMD 304 relative to the first user 306 and the first HMD 302 based on inputs from cameras 318, 310, 312, and 322, and sensors on either HMDs 302 and 304 (not shown). As a result, VR content sharing logics 334 and 316 are able to modify and render a secondary VR scene for the second HMD 304 having a virtual perspective within the VR scene that corresponds to the perspective of second HMD 304 and the second user 308 in the real world.

Additionally, an avatar of the second user 308 is rendered by VR content sharing logics 334 and 316 and VR content generators 332 and 336. PODLs 340 and 342, having detected the position and orientation of the second user 308 relative to the first user 306, may then inform VR content sharing logics 334 and 316 and VR content generators 332 and 336 on how to render the avatar of the second user 308 to appear to the first user 302, according to some embodiments.

It should be noted that although two distinct computers 326 and 328 are shown to execute the VR content for respective HMDs 302 and 304, one skilled in the art would appreciate that the number of computers is not of consequence to the making and using of the embodiments presented herein. For example, certain embodiments may have a single computer providing both HMDs with VR content and the ability to enter and exit different VR environments navigated by different HMD users. In certain other embodiments, computers 326 and 328 may be instantiated on a distributed computing system wherein operations related to dynamic entering and exiting of VR scenes/environments navigated by different users is performed at remote servers over a network.

It should also be noted that although computers 326 and 328 are shown to be a separate unit from HMDs 302 and 304, respectively, one skilled in the art would readily appreciate that the location or placement of the computer is not material to the making and using of the embodiments for dynamically entering and leaving of VR scenes of other HMD users. For example, computers 326 and 328 may be housed within HMDs 302 and 304, respectively. In these embodiments, for example, the computing system may be a mobile computing device such as a mobile phone. In a further example, computers 326 and 328 may be located on a cloud platform and not co-located with users 306 or 308.

Also shown in FIG. 3 are infrared light (IR) sources 346 and 348, which are configured to emanate IR light rays toward the HMDs. According some embodiments, the HMD may have an array of photo-sensitive diodes (PSDs) that detect incident IR light rays. PODL 340 is able to use IR emission data and PSD detection data to determine position and orientation of HMDs 302 and 304.

One of ordinary skill in the art would appreciate that there are numerous other ways of implementing tracking a position and orientation of an object such as an HMD other than those specified thus far without departing from the scope and spirit of the principles of a system and method for dynamically entering and leaving of a VR scene. That is, the particular mode of tracking an HMD is immaterial to the functioning of sharing a VR scene, or dynamically entering and exiting a VR scene navigated by different users.

Figure 4:
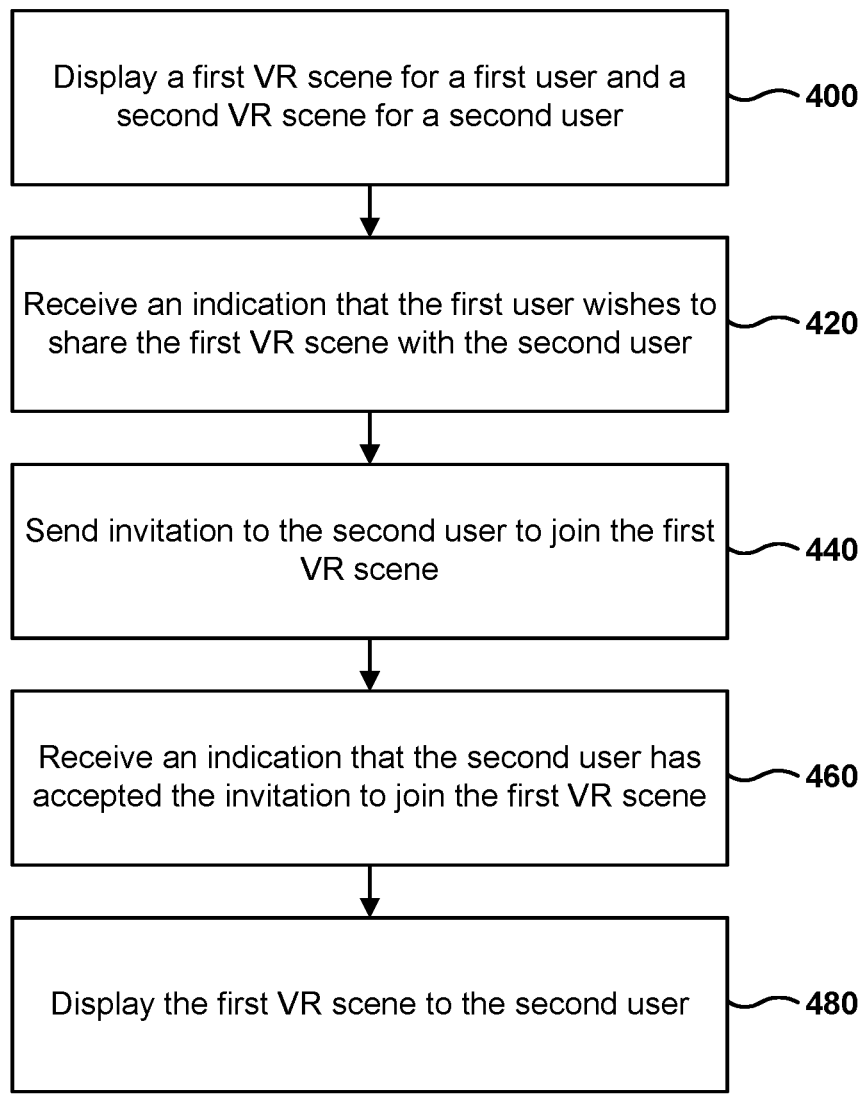
FIG. 4 shows an overall flow of a method for allowing a host to invite a guest into a virtual reality environment and for the guest to join the virtual reality environment of the host

FIG. 4 shows an embodiment of a method for allow dynamic entering and leaving of VR environments navigated by different users. In operation 400, the method displays a first VR scene for a first user and a second VR scene for a second user. The method then flows to operation 420, in which the method receives and indication that the first user wishes to share the first VR with the second user. As a result of operation 420, operation 440 sends an invitation to the second user to join the VR of the first user. As mentioned above, the invitation may take one of many forms, such as a verbal invitation, a textual invitation, and animated invitation, etc.

If the second user accepts the invitation, the method flows to operation 460, where an indication is received that the second user has accepted the invitation to join the first user in the first VR scene. The method then flows to operation 480, where the first VR scene is displayed to the second user.

Although not shown for the sake of clarity, the first VR scene to be displayed to the second user is to be modified to have a virtual perspective that corresponds to his perspective in the real world relative to the first user, as discussed earlier. Furthermore, when the first VR scene is displayed to the second user, the second VR scene may be paused. If and when the second user chooses to return to the second VR, the second VR may be displayed at a point where it was paused or at some earlier point.

Figure 5:
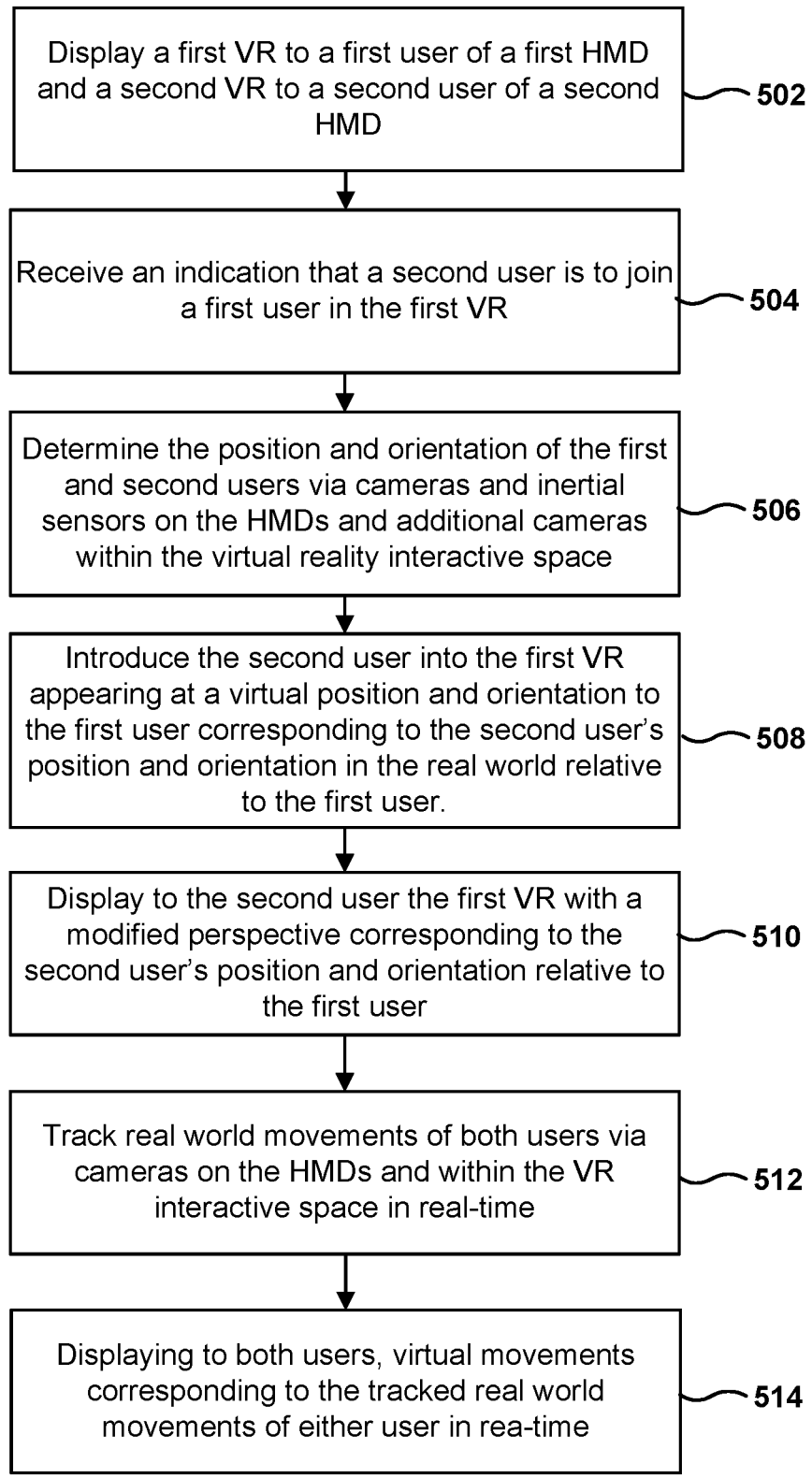
FIG. 5 shows an overall flow of a method for introducing the VR of a host to a guest.

FIG. 5 shows an embodiment of a method that joins a second HMD user with the VR of a first HMD user. In operation 506, the position and orientation of both the first and second users are determined via cameras and inertial sensors disposed in and on the HMD and additional cameras within the VR interactive space (and processed by a PODL). Once these parameters are determined, the method then flows to operation 508, which introduces a virtual representation of the second user into the VR of the first user appearing at a virtual position and orientation corresponding to the second user's position and orientation in the real world relative to the first user. For example, if the second user is positioned directly ahead of the first user and the first user is positioned directly ahead of the second user (e.g., they are facing each other), then the method will introduce a virtual representation of the second user into the VR that is located directly ahead of the first user. In this example, the virtual representation of the second user will also appear to be facing the first user (i.e., the two are looking at each other in the shared VR).

For the second user, operation 510 displays the first VR with a modified perspective corresponding to the second user's position and orientation in the real world relative to the first user. Thus, if the two users are facing each other in the real world, they will see completely different fields of view in the VR. But, if for example, the second user turns 180 degrees to face the same direction as the first user, his change in orientation will be tracked by method 512, via cameras on the HMDs and within the VR interactive space in real-time. The second user will now have a perspective similar to that of the first user, since he is now facing the same direction as the first user. The second user's turning around will also be apparent to the first user because the method flows to operation 514, which displays to both users virtual movements corresponding to the tracked real world movements in real time. Thus, the first user is not only aware of the second user's turning around, but he is able see the second user turning around in real-time.

Figure 6:
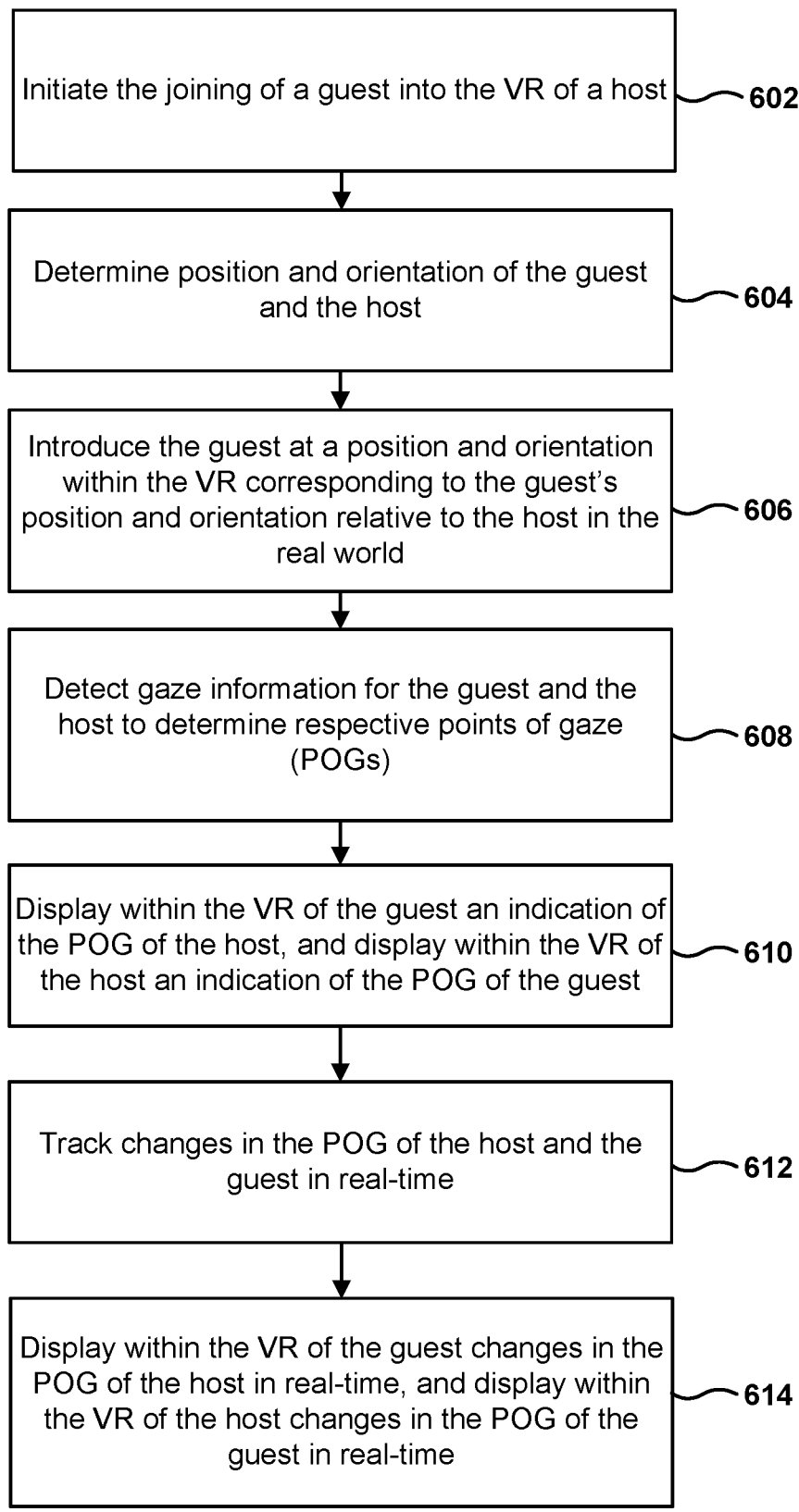
FIG. 6 shows a flow of a method for allowing a host and a guest of a shared VR to communicate a point of gaze (POG) to one another virtually

FIG. 6 illustrates a method for allowing HMD users having a shared VR to determine a point of gaze (POG) of the other user (e.g., see where another user is looking or what another user is looking at). For example, in operation 608, gaze information for a guest (second user) and a host (first user) is detected and processed to determine respective points of gaze. Once the POG of the guest and host is determined, operation 610 displays within the shared VR of the guest and indication of the host's POG. Operation 610 also displays within the shared VR of the host an indication of the guest's POG. Gaze indication may take one or more of many forms. For example, the indication may take the form of a reticle. In other embodiments, the indication may appear as a highlighted virtual object or area. In still further embodiments, the indication take the form of a shape's outline. Although not shown, a user's own POG may also be indicated to himself via an indication of POG that differs from that of another user. In some embodiments, if more than two users happen to share a VR, each user's gaze indication may take on a different form to avoid confusion.

The method then flows to operation 612, which tracks changes in the POG of the host and guest in real-time via gaze tracking camera/s. As a result of this tracking, operation 614 is able to display within the shared VR indications of changes in both the host and the guest's POG to the other.

Figure 7:
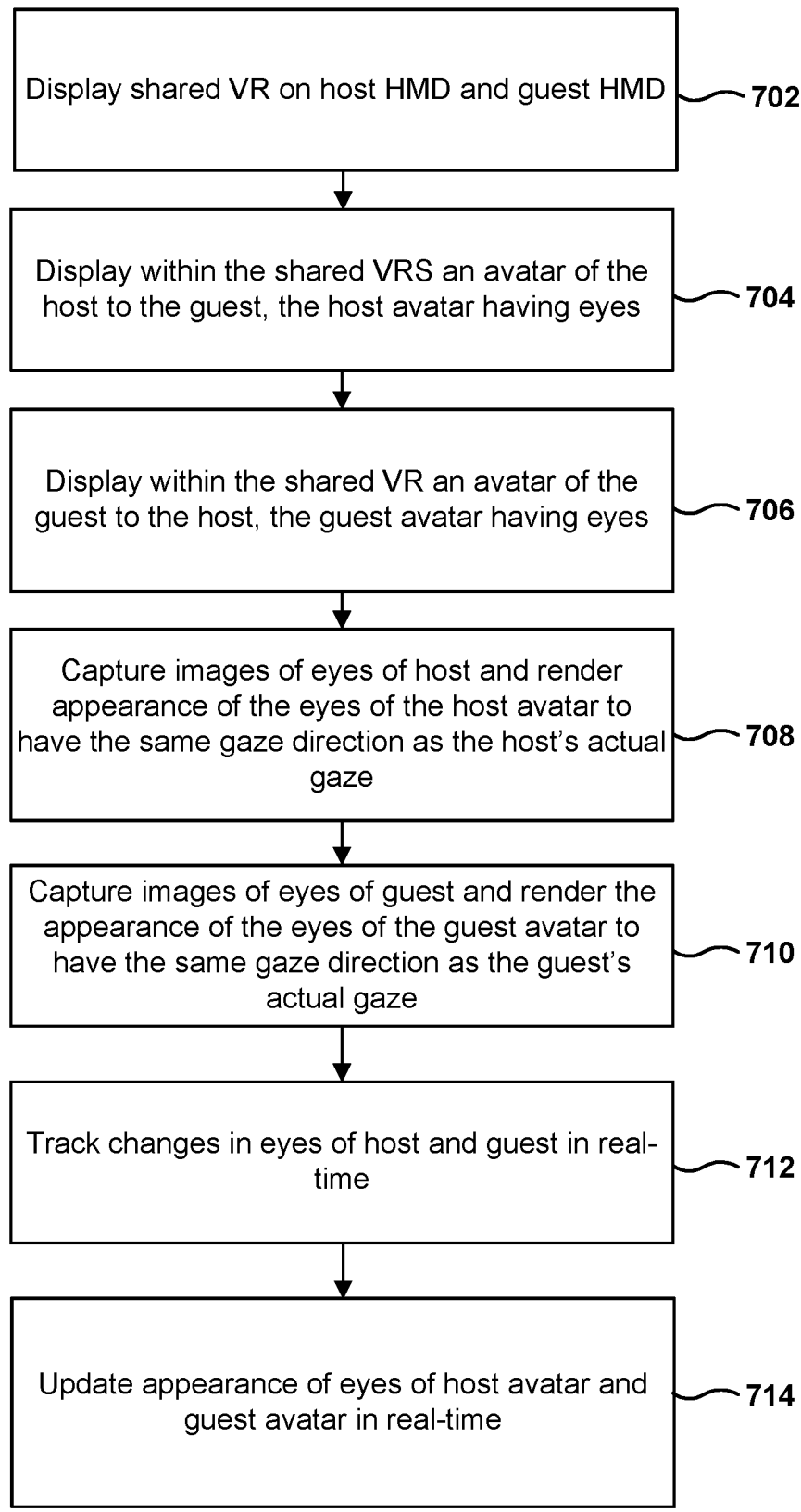
FIG. 7 shows a flow of a method for allowing a host and a guest to ascertain one another's POG by looking at an avatar of the other.

FIG. 7 shows a flow of a method for allowing an HMD user to ascertain a gaze direction of another by looking at the eyes of an avatar of the other. In this embodiment, a host and guest are displayed with a shared VR wherein each of the respective avatars has eyes or some other semblance of visual capacity (operations 702, 704, and 706). In operations 708 and 710, images of the eyes of the host and guest are captured, for example, by gaze detection cameras within respective HMDs. Additionally, the method renders an appearance of the eyes of the avatars to match that of the respective users. That is, the host's avatar will have eyes appearing to gaze in a direction that is the same as the host's actual direction of gaze. The same is may be true of the guest. In operation 712, real-time changes of both users' eyes are tracked so that updated appearances of both avatars eyes may be provided by operation 714.

Figure 8A:
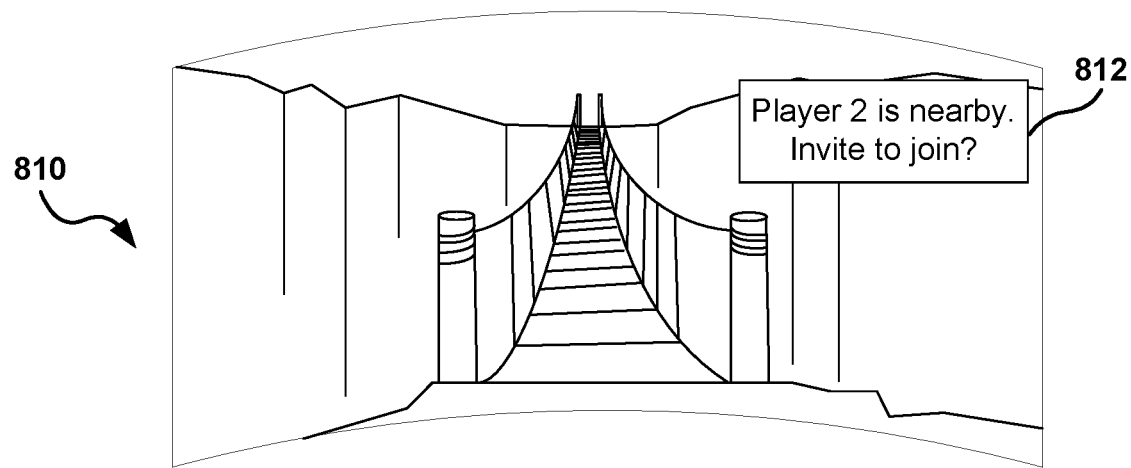
FIGS. 8A and 8B show embodiments of a method to send and receive invitations to join into a shared VR.
Figure 8B:
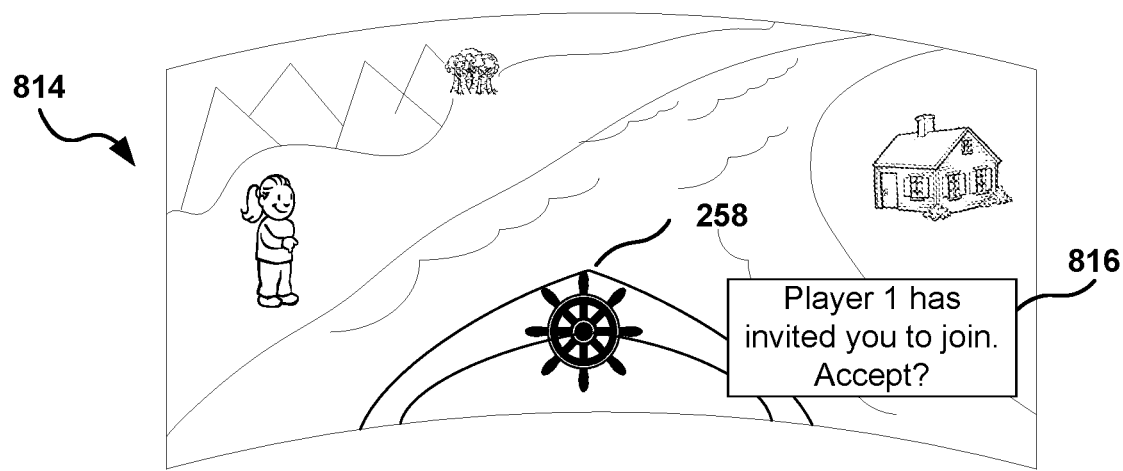

FIGS. 8A and 8B show embodiments of a method of sending and receiving invitations to join into a shared VR. For example, a first player being displayed a VR scene 810 may be alerted that a second player is nearby and prompted to invite the second player to join into VR scene 810. The prompt 812 may take the form of a block of text as shown in FIG. 8A, but as previously discussed, a prompt may be delivered in one of many ways. Likewise, the first player may respond to prompt 812 in one or more of many ways, including a verbal command, a push of a controller button, a gesture, a gaze behavior, and a bodily movement in order to accept or reject prompt 812.

If the first player happens to accept prompt 812 to invite the second player, an indication such as invite 816 may appear in VR scene 814 of the second player. Again, invite 816 may take one or more of many forms and the second player may wish to accept or reject invite 816 in one or more of a number of ways.

Figure 9C:
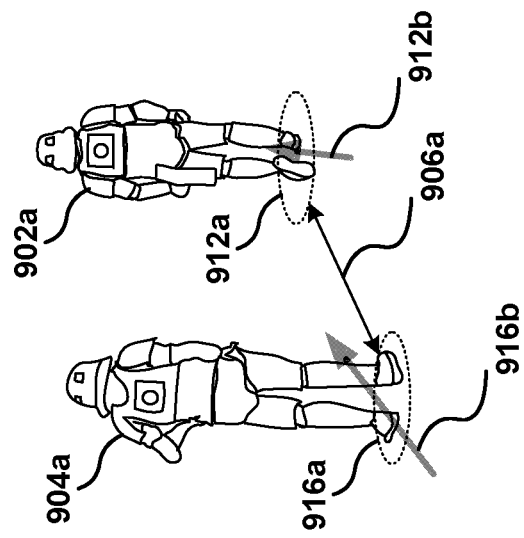
FIGS. 9A-9C show a third-party sequential view of how two co-located HMD users may appear in a shared physical space as well as a shared VR space as a guest joins into a host's VR.
Figure 9B:
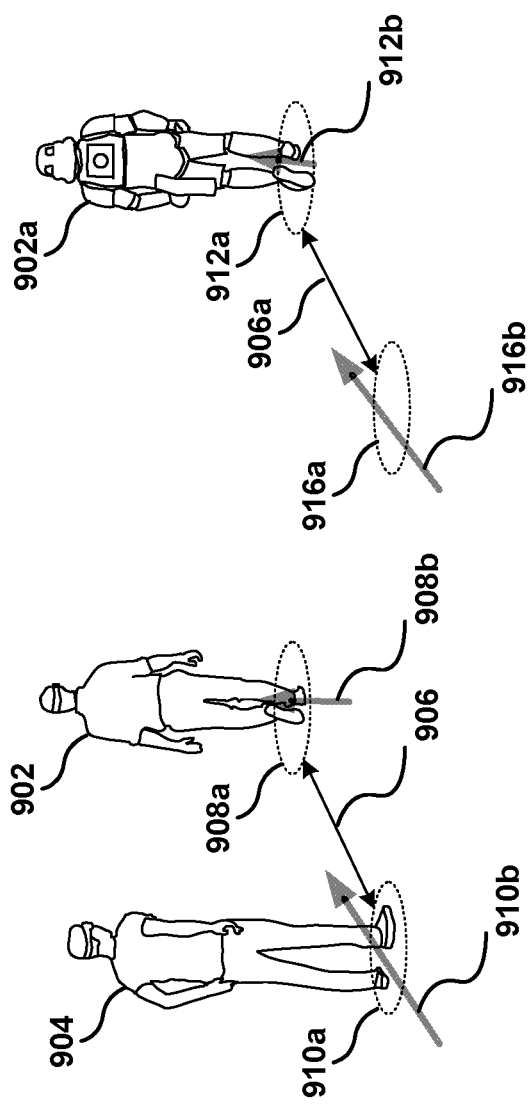
Figure 9A:
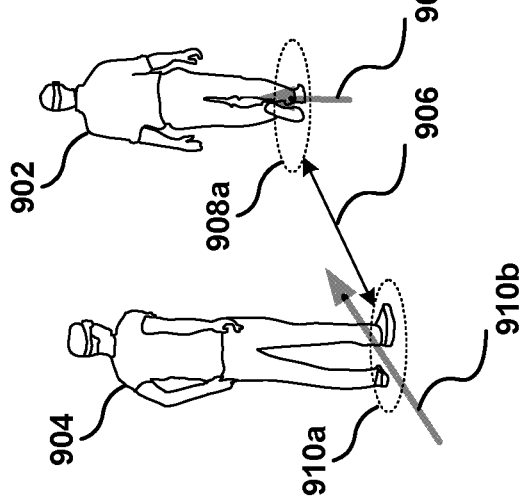

FIGS. 9A-9C show a third party sequential view of how two co-located HMD users may appear in a shared physical space as well as a shared virtual space once a guest joins into a host VR. Host 902 is shown to be co-located with guest 904 in the real world. Both are engaged in a VR environment via HMDs. Guest 904 accepts an invitation to join the VR of host 902. The host's position 908a and orientation 908b and the guest's position 910a and orientation 910b are being tracked by a computer (not shown). The distance 906 between host 902 and guest 904 is also shown to be tracked.

FIG. 9B shows a third party perspective of the host avatar 902a within a VR by himself. The host avatar 902a's position 912a and orientation 912b are shown as not changed. An indication of the position 916a and orientation 916b of where the guest avatar is to be inserted into the shared VR is shown. The distance between host and guest 906 remains about the same in virtual space 906a.

FIG. 9C shows the same third party perspective of the shared VR having both the host avatar 902a and the guest avatar 904a in view. The guest avatar 904a is shown to be introduced into the shared VR at a position 916a and orientation 916b corresponding to his position 910a and orientation 910b in the real world.

Figure 10A:
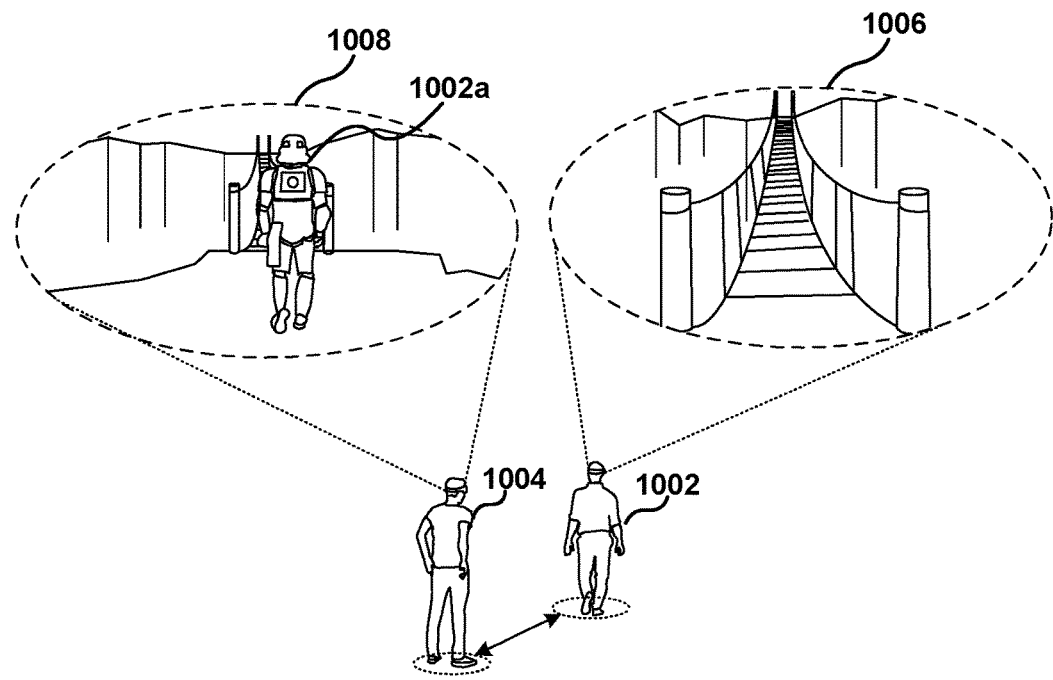
FIGS. 10A and 10B show inter-avatar interaction within a shared VR environment by two co-located HMD users.

FIG. 10A shows the same two co-located HMD users sharing a VR scene. 1006 is a 2 dimensional snapshot of how a VR scene might appear to host 1002. 1008 is a snapshot of a guest 1004 perspective. Host 1002 sees an upcoming bridge via his HMD. Guest 1004 sees the same bridge but from a slightly different perspective, the difference in perspective corresponding to a difference in the real world location of the guest relative to the host. Guest 1004 also sees host avatar 1002a approaching the bridge.

Figure 10B:
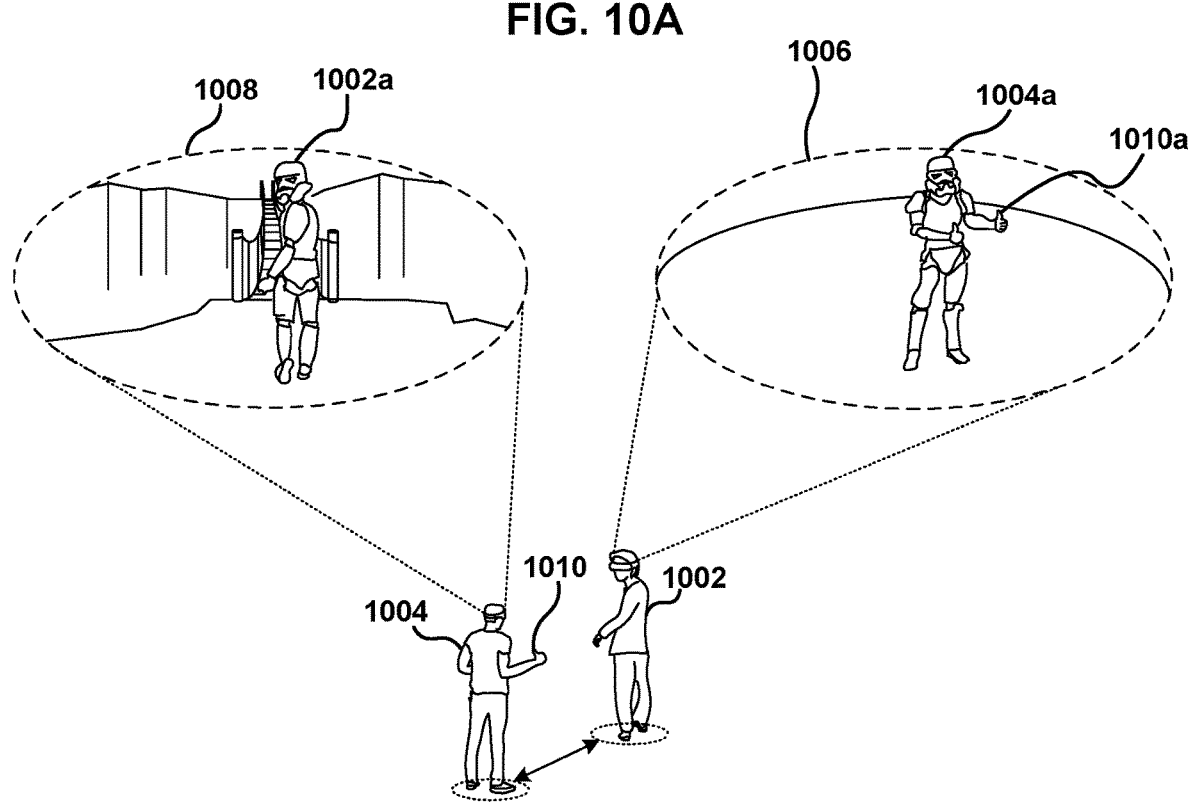

FIG. 10B shows the same two co-located HMD users a moment later. Host 1002 is shown to be looking back over his shoulder. Host 1002 is able to see guest avatar 1004a in snapshot 1006 and guest 1004 is able to see host avatar 1002a in snapshot 1008. Meanwhile, guest 1004, wishing to encourage or otherwise interact virtually with host 1002 with the VR scene, gives a thumbs-up gesture 1010 in the real-world. The thumbs up gesture 1010 is mapped to virtual space via a computer to display a virtual thumbs up 1010a being given by guest avatar 1004a. The gesture 1010a is seen by the host 1002, as shown in snapshot 1006.

Figure 11A:
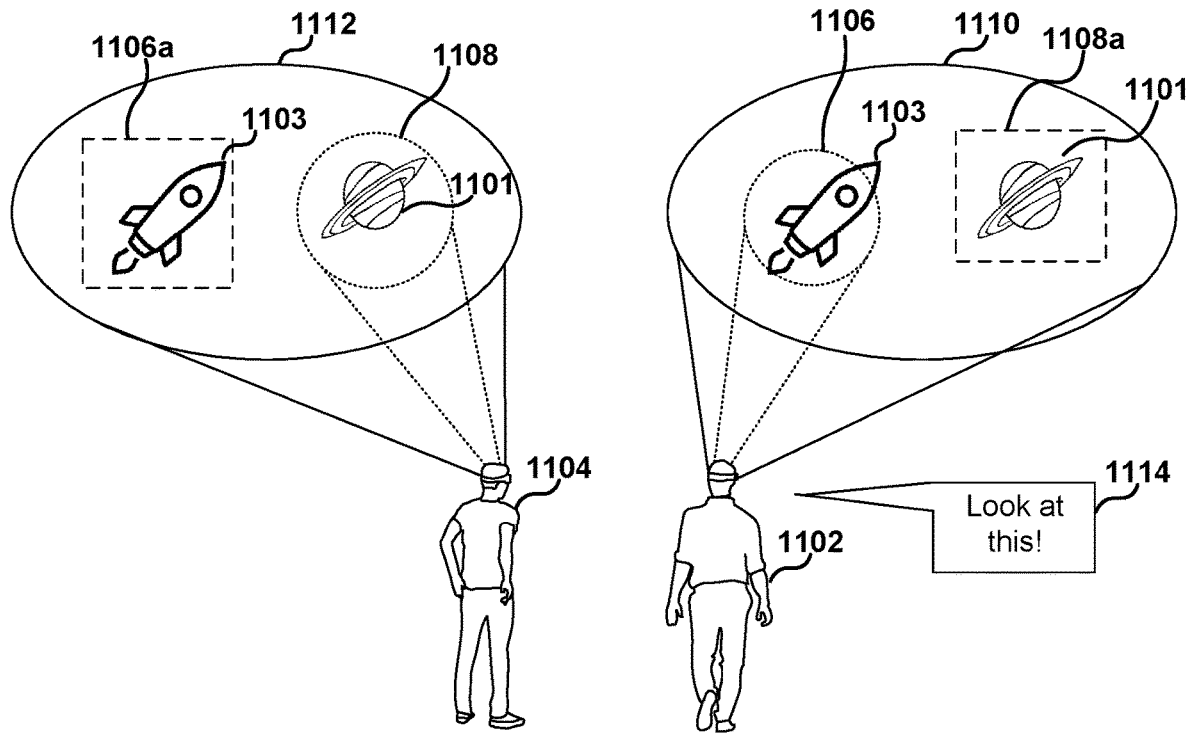
FIGS. 11A and 11B show an embodiment of how a first user's POG may be communicated to a second user and vice versa.

FIG. 11A shows two co-located HMD users viewing a same VR scene. The VR scene includes a planet 1101 and a spaceship 1103. Host 1102 and guest 1104 are being presented VR scenes 1110 and 1112, respectively. Though scenes 1110 and 1112 appear similar, host 1102 and guest 1104 might have differing POGs (e.g., looking at different things). In the present example, host 1102 has a POG 1106 over spaceship 1103, while guest 1104 has a POG 1108 of planet 1101. In certain embodiments, the POG of the other user can be indicated in the VR scene. For example, the POG 1108 of guest 1104 may be indicated in VR scene 1110 by a square indication 1108a, allowing host 1102 to ascertain the guest's POG. Meanwhile, the POG 1106 of host 1102 is visible to guest 1104 in VR scene 1112 in the form of square indication 1106a. In this example, the host 1102 may wish to direct the attention of the guest 1104 to the spaceship 1103 by verbally communicating 1114, for example, "look at this!"

Figure 11B:
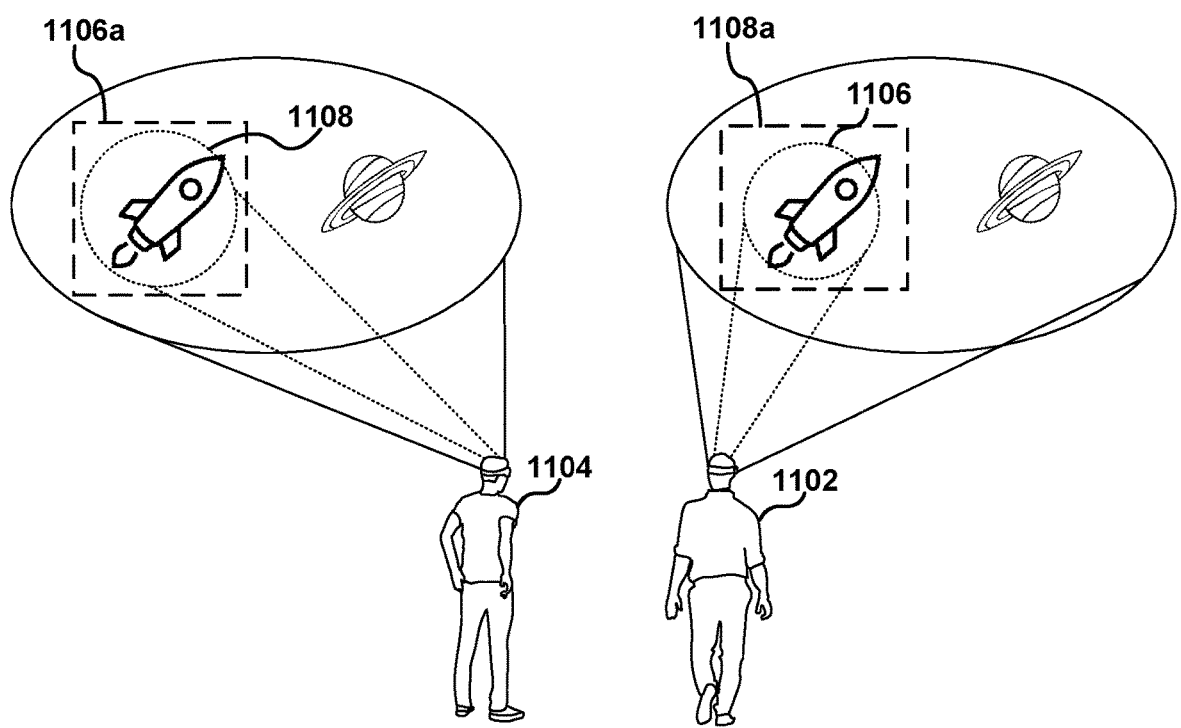

In FIG. 11B, the guest 1104 changes his POG 1108 in response to the host's 1104 communicating 1114. In certain embodiments, the guest 1104 knows where to direct his attention to because of the indication 1106a of the host's POG. In this example, guest 1104 proceeds to change his POG 1108 to also look at the spaceship 1103. Host 1102 is aware of this change in POG because indication 1108a of the guest's POG is shown to be also directed at spaceship 1103.

Figure 12A:
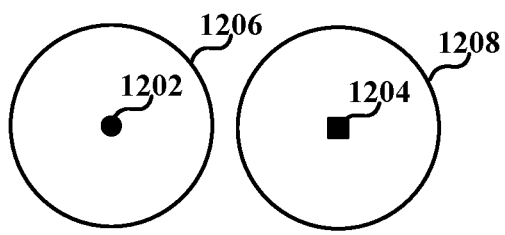
FIGS. 12A-12J show a dynamic entering into a host VR by a guest based on respective VR "halo" positioning.
Figure 12B:
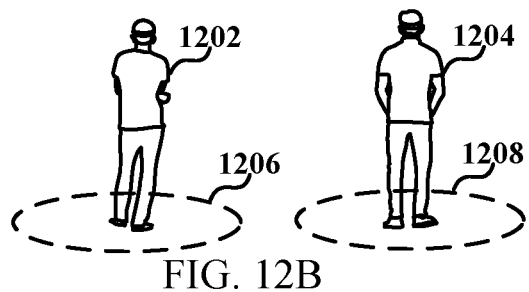

FIGS. 12A-12J show an embodiment of a dynamic entering into a host VR by a guest based on respective VR halo positioning. FIG. 12A, for example, shows a schematic view of a host 1202 and a guest 1204 having halo 1206 and 1208, respectively, while being presented separate VR scenes. FIG. 12B shows the same state of affairs as FIG. 12A from a real world third party view. Although halos 1206 and 1208 are shown to be of similar size and shape, one skilled in the art would appreciate that the size and shape of either halo might differ from one another and from different points in time.

Figure 12C:
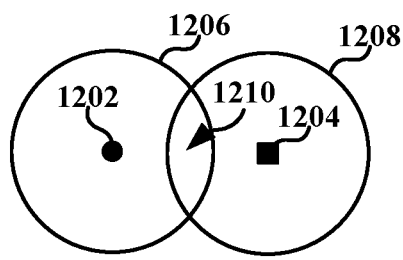
Figure 12D:
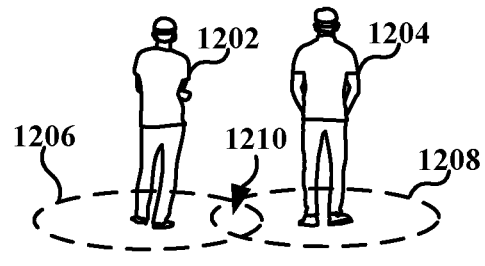

In FIGS. 12C and 12B, guest 1204 is shown to have moved closer to host 1202 such that halos 1206 and 1208 overlap to an extent 1210. As earlier discussed, halos represent a space in which a user of an HMD may be expected to move about or gesture within. Thus, when halos overlap, a probability of users colliding with one another may increase. When an overlap of two or more halos is detected, users 1202 and 1204 will be notified, for example, by way of prompts and invitations as shown in FIGS. 8A and 8B. If there is not a mutual desire or indication to share a VR scene, then users 1202 and 1204 may be provided with instructions create separation between one another. If, on the other hand, there is a mutual desire or indication to share a VR scene, the users may be provided with instructions to move closer to one another such that, for example, the guest 1204 is within the bounds of halo 1206.

Figure 12E:
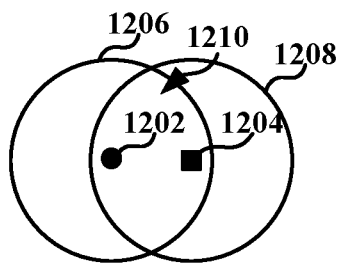
Figure 12F:
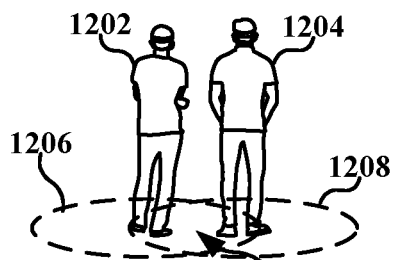

FIGS. 12E and 12F show host 1202 and guest 1204 positioned in closer proximity such that not only is there an overlap 1210, but that at least the guest 1204 is within the halo 1206 of the host 1208. That the host 1202 is also within the halo 1208 of the guest 1204 is coincidental, owing to the similar size and shape of the two halos. Nevertheless, in certain embodiments, it is when guest 1204 is positioned within halo 1206 of host 1202 that guest 1204 may be introduced into the VR scene of the host 1202.

Figure 12G:
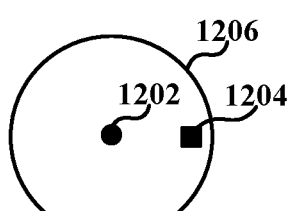
Figure 12H:
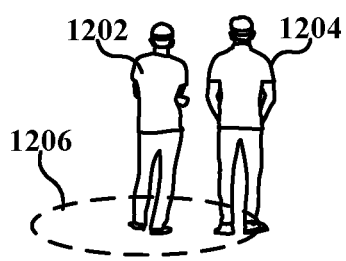
Figure 12I:
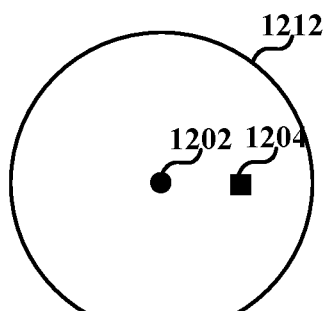
Figure 12J:
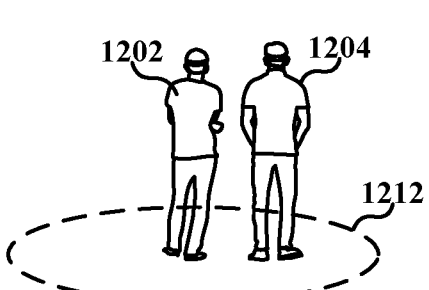

FIGS. 12G and 12F show host 1202 and guest 1204 having a shared VR scene, as denoted by the loss of halo 1208 of the guest 1204 with both users sharing halo 1206. In certain embodiments, the method may additionally resize the shared halo to accommodate movement and actions of both users, as shown in FIGS. 121 and 12J.

Figure 13A:
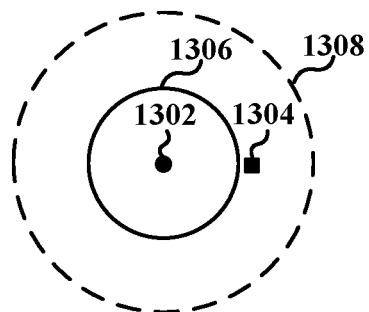
FIGS. 13A-13F show a dynamic leaving of a host VR by a guest based on respective VR "halo" positioning.
Figure 13B:
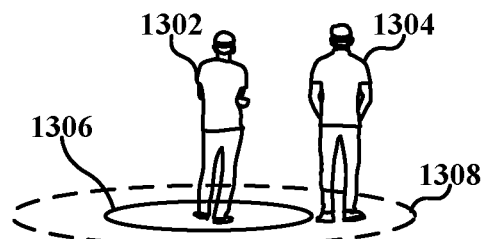

FIGS. 13A-13f show an embodiment of a method of a dynamic leaving of a host VR by a guest based on respective VR halo positioning. FIGS. 13A and 13B, for example, show a host 1302 and guest 1304 sharing a VR scene. According to the example, two halos are shown to be associated with the shared VR, a primary halo 1306 and a secondary halo 1308. According to the present embodiment, the primary halo 1306 represents a typical space in which users are expected to move or gesture at any given moment. The secondary halo 1308 serves as the outer bounds of where guest 1304 may be located and still be supported with the VR scene of the host 1302. The space between the primary halo 1306 and the secondary halo 1308, may in some embodiments, serve as a buffer zone in which guest 1308 may be prompted reposition himself (e.g., guest 1304 happens to outside of primary halo 1306 but within secondary halo 1308.) As a result, guest 1304 may be prompted to either move closer to host 1302 to continue in the shared VR scene, or to move further away from host 1302 to leave the shared VR scene.

Figure 13C:
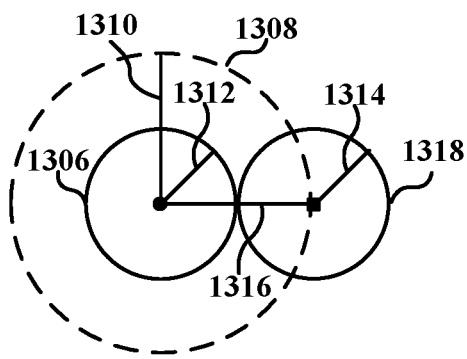
Figure 13D:
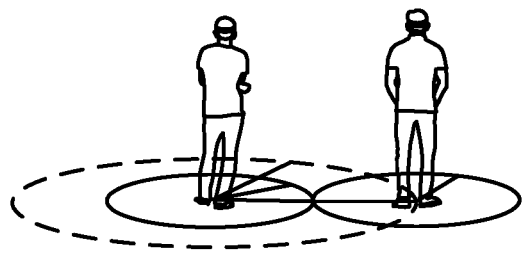

FIGS. 13C and 13D show the guest 1304 to have moved to a distance 1316 away from host 1302. As a result, guest 1304 has left the shared VR and has re-entered a VR of his own with halo 1318. In some embodiments, to ensure that there is no overlap between halos 1306 and 1318, the distance 1316 separating host 1302 and guest 1304 must be equal or greater than the sum of radii 1312 and 1314.

Figure 13E:
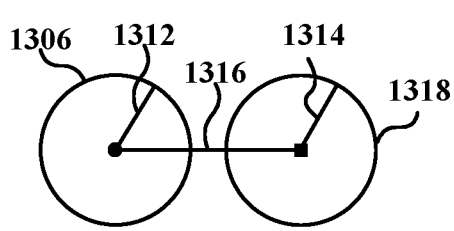
Figure 13F:
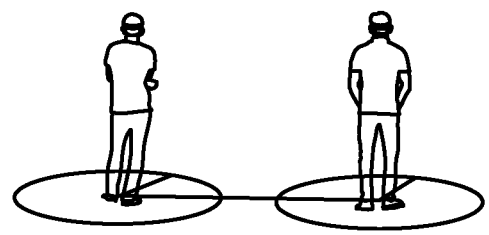

According to certain embodiments, radius 1310 of secondary halo 1308 is determined at least partially from the sum of radii 1312 and 1314. Some embodiments may require a greater separation distance 1316 before allowing guest 1304 to re-enter his own VR. For example, FIGS. 13E and 13F shows two users separated by a distance 1316 that is greater than the sum of radii 1312 and 1314.

Figure 14A:
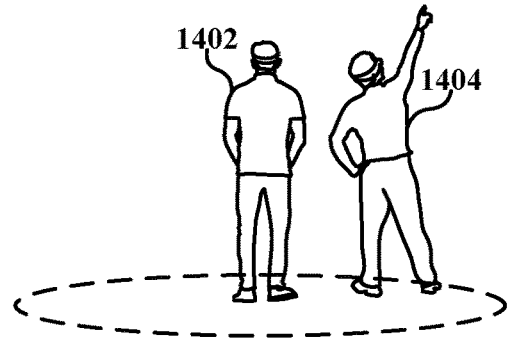
FIGS. 14A-14H show various types of interactions between respective avatars of a host and a guest within a shared VR that certain embodiments are capable of supporting.
Figure 14B:
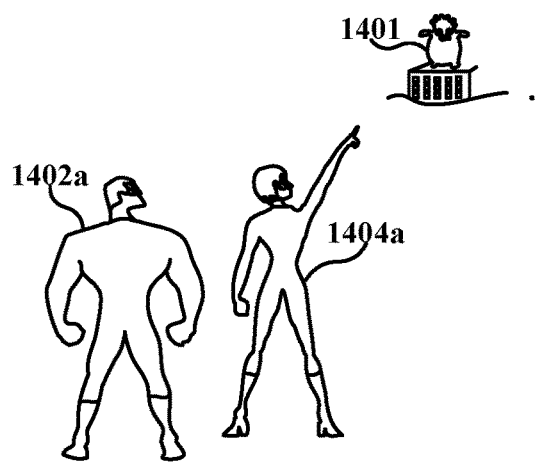

FIGS. 14A-14H show various examples of the types of inter-avatar interaction between a host and guest within a shared VR that certain embodiments are capable of supporting. FIGS. 14A and 14B, for example, show a host 1402 and guest 1404 standing side by side in a shared VR. Guest 1404 wishes to draw host 1402's attention to a monster 1401 he sees, and points to it as he would otherwise in the real world. Host 1402 sees the pointing gesture of guest avatar 1404a and looks in the same direction. According to this embodiment, natural real-world behaviors for communicating a point of interest can be used instead or in addition to VR specific methods such as gaze indicators.

Figure 14C:
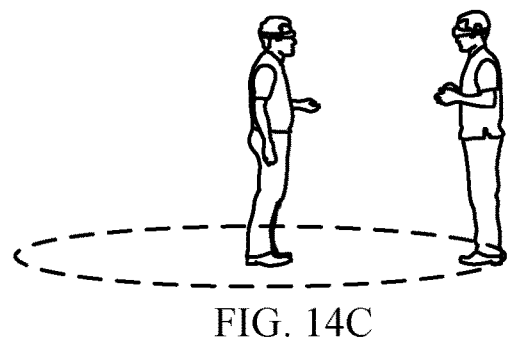
Figure 14D:
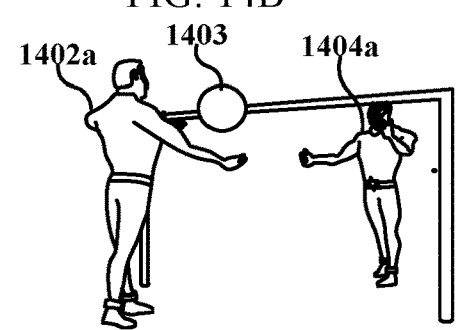
Figure 14E:
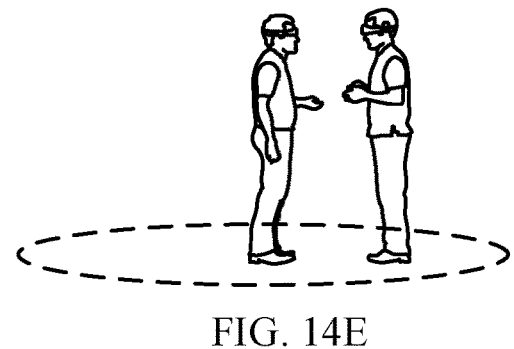
Figure 14F:
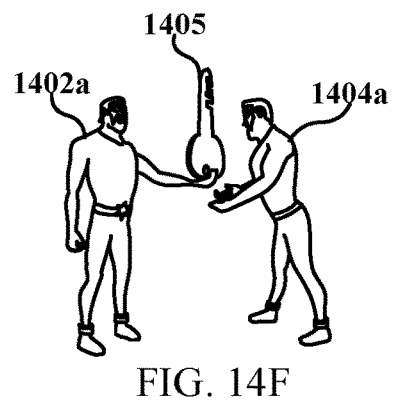
Figure 14G:
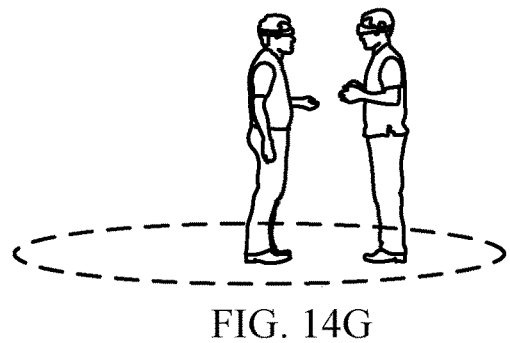
Figure 14H:
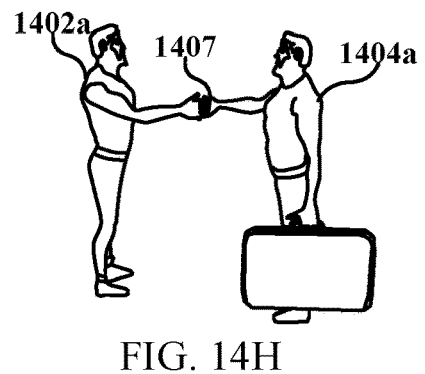

FIGS. 14C and 14D show a host and guest facing one another in a shared VR scene. In some embodiments, the shared VR scene may be capable of supporting inter-avatar interactions such as passing a virtual object 1403 from one avatar to another. Host avatar 1402a is shown to be passing a virtual object 1403 to 1404a some distance away. Much like in the real world, the two users must communicate and coordinate to complete the task via their respective avatars. FIGS. 14E and 14F show a similar type of interaction where host 1402 and guest 1404 are close enough to hand a virtual object 1405 to the other. Again, much like in the real world, inter-avatar interaction depends upon proper communication, coordination, and awareness of the virtual happenings of other avatars. In certain other embodiments, inter-avatar interaction involving touch 1407 may be supported. For example, FIGS. 14G and 14H show avatars 1402a and 1404a shaking hands, which may be a result of a real world handshake.

Figure 15A:
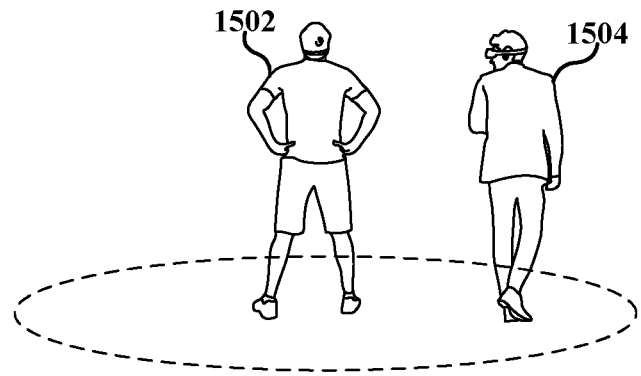
FIGS. 15A-15E show an additional embodiment for communicating a direction of gaze by mirroring a user's actual direction of gaze in the virtual eyes of the user's avatar.
Figure 15B:
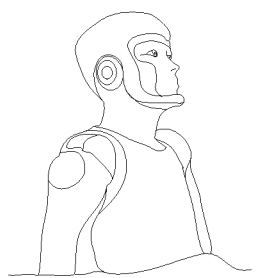
Figure 15C:
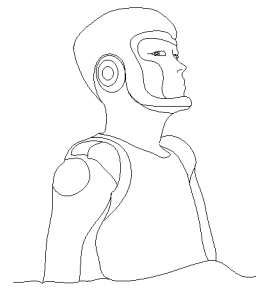
Figure 15D:
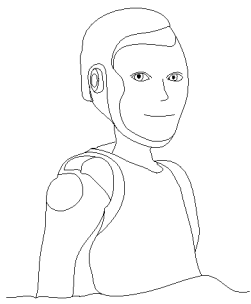
Figure 15E:
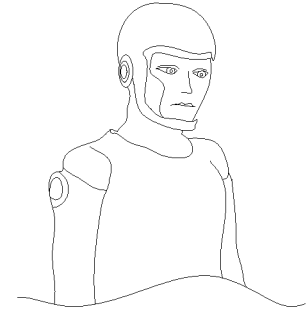

FIGS. 15A-15E show additional embodiments for ascertaining and communicating gaze information to another user in a shared VR. FIG. 15A, for example, shows a guest 1504 looking towards host 1502 to ascertain where the host 1502 is looking. FIGS. 15B-15E show various states of how an avatar of the host 1502 might appear to the guest 1504 as the host 1502 looks in different directions. FIG. 15B, for example, shows a host avatar to be looking up and into the distance. While host avatar in 15C maintains the same head position as in FIG. 15B, changes in the positioning of the avatar's eyes shows host 1502 looking at guest 1504 through the corner of his eyes. FIG. 15D also shows host avatar looking at the guest but in a more head-on manner while 15E shows host avatar to be looking down and to the guest's right-hand side.

As discussed earlier, certain embodiments support the imaging and mapping of user eye data to the eyes of a respective avatar. In these embodiments, users are able to communicate direction of gaze by looking at the other, as if it were occurring in the real world.

Figure 16:
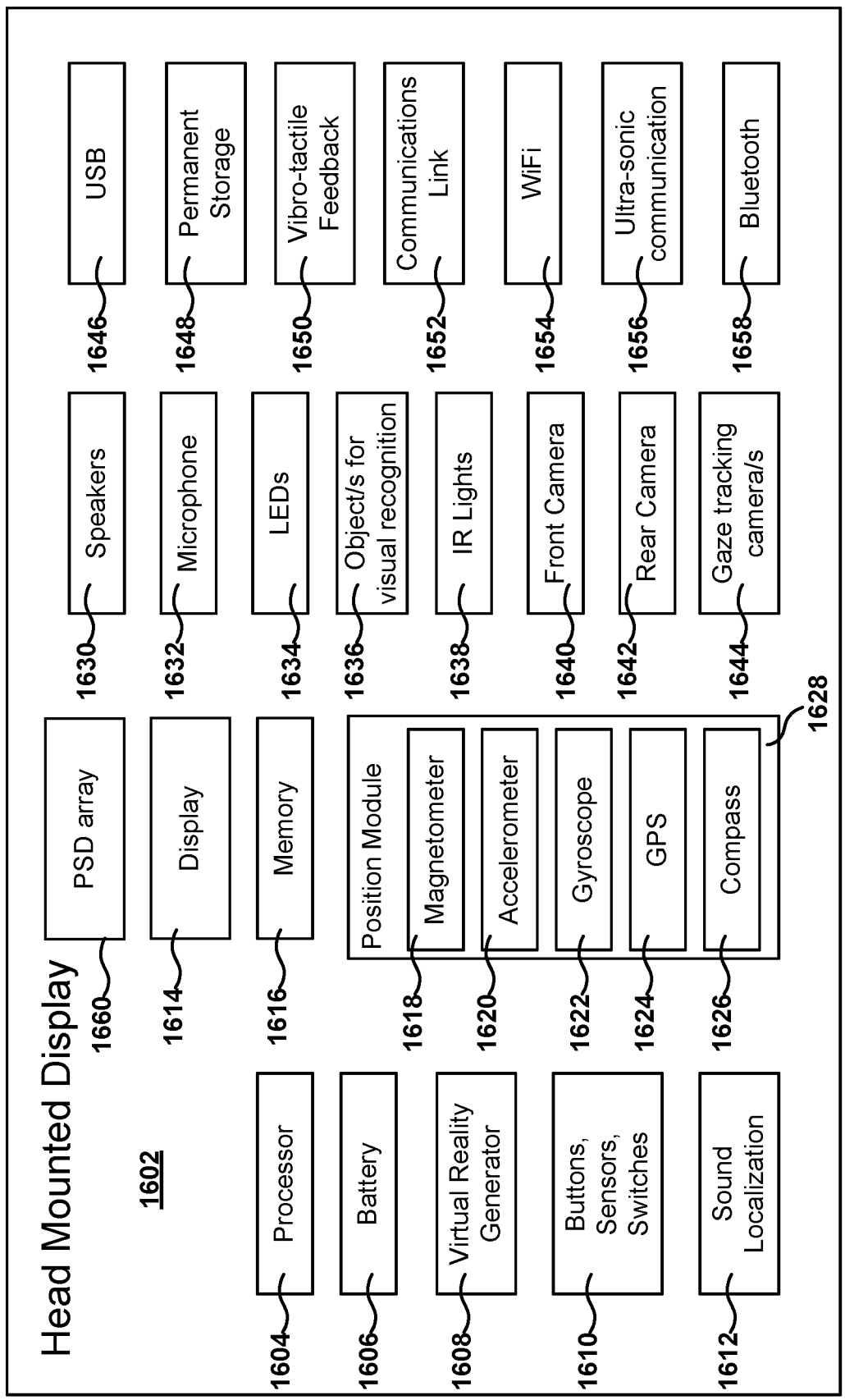
FIG. 16 shows an embodiment of some of the components of a head mounted display, according to one embodiment.

FIG. 16 illustrates and additional embodiment of an HMD 1602 that may be used with the presented method and/or system. HMD 1602 includes hardware such as a processor 1604, battery 1606, virtual reality generator 1608, buttons, sensors, switches 1610, sound localization 1612, display 1614, and memory 1616. HMD 1602 is also shown to include a position module 1328 that comprises a magnetometer 1618, an accelerometer 1620, a gyroscope 1622, a GPS 1624, and a compass 1626. Further included on HMD 102 are speakers 1630, microphone 1632, LEDs 1634, object/s for visual recognition 1636, IR lights 1638, front camera 1640, rear camera 1642, gaze tracking camera/s 1644, USB 1646, permanent storage 1648, vibro-tactile feedback 1650, communications link 1652, WiFi 1654, ultra-sonic communication 1656, Bluetooth 1658, and photo-sensitive diodes (PSD) array 1660.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the changing of VR operations are performed in the desired way.

The entire disclosure of co-pending U.S. application Ser. No. 14/206,219, filed Mar. 12, 2014, entitled "SWITCHING MODE OF OPERATION IN A HEAD MOUNTED DISPLAY," is hereby fully incorporated by reference. The entire disclosure of co-pending U.S. application Ser. No. 14/658,123, filed Mar. 13, 2014, entitled "METHODS AND SYSTEMS TRACKING HEAD MOUNTED DISPLAY (HMD AND CALIBRATIONS FOR HMD HEADBAND ADJUSTMENTS," is hereby fully incorporated by reference. The entire disclosure of co-pending U.S. application Ser. No. 14/615,115, filed Feb. 5, 2015, entitled "MOTION SICKNESS MONITORING AND APPLICATION OF SUPPLEMENTAL SOUND TO COUNTERACT SICKNESS," is hereby fully incorporated by reference. The entire disclosure of co-pending U.S. application Ser. No. 14/658, 123, filed Mar. 13, 2014, entitled "METHODS AND SYSTEMS TRACKING HEAD MOUNTED DISPLAY (HMD AND CALIBRATIONS FOR HMD HEADBAND ADJUSTMENTS," is hereby fully incorporated by reference.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method for processing operations for head mounted display (HMD) users to join virtual reality (VR) scenes, comprising:
providing a first perspective of a VR scene to a first HMD of a first user;
receiving an indication that a second user of a second HMD is requesting to join the VR scene provided to the first HMD;

obtaining real-world position and orientation data of the second HMD relative to the first HMD, the real-world position and orientation data is usable to determine a relative location of the second HMD from the first HMD in a real-world space; and providing, based on the real-world position and orientation data, a second perspective of the VR scene to join the VR scene by the second user, the second perspective is shifted from the first perspective corresponding to a difference in the relative location of the second HMD from the first HMD in real-world space;

wherein the first perspective and the second perspective of the VR scene are each controlled by respective position and orientation changes of the first HMD and the second HMD, wherein the first user of the first HMD controls a progression of the VR scene and the progression causes a movement of the first perspective toward a direction within the VR scene, and said movement causes a corresponding movement toward the direction within the VR scene for the second perspective while substantially maintaining the shifted perspective between the first perspective and the second perspective.

2. The computer-implemented method as recited in claim 1, wherein the first user of the first HMD and the second user of the second HMD are co-located in a real-world location.

3. The computer-implemented method as recited in claim 1, wherein the second user of the second HMD is a spectator to the VR scene.

4. The computer-implemented method as recited in claim 1, wherein the progression of the VR scene includes one of completing a task within the VR scene, directing a movement within the VR scene, solving a puzzle within the VR scene, defeating an enemy within the VR scene, scoring one or more points within the VR scene, reaching a higher level within the VR scene, or interacting with content in the VR scene.

5. The computer-implemented method as recited in claim 1, wherein control of the progression of the VR scene is transferred from the first user of the first HMD to the second user of the second HMD and the progression of the VR scene is dependent on changes in real-world position and orientation of the second user while viewing the VR scene.

6. The computer-implemented method as recited in claim 1, wherein the indication that the second user of the second HMD is requesting to join the VR scene provided to the first HMD includes detecting that the second user is within a predetermined proximity of the first user in a real-world location.

7. The computer-implemented method as recited in claim 1, wherein the real world position and orientation data is obtained through one or both of inertial sensor data and image capture data.

8. The computer-implemented method as recited in claim 1, further comprising:
detecting, by one or more gaze detection cameras, a first point of gaze (POG) of the first user of the first HMD and a second POG of the second user of the second HMD; and
providing an indication of the first POG within the second perspective of the VR scene and an indication of the second POG within the first perspective of the VR scene.

9. The computer-implemented method as recited in claim 1, further comprising:
providing, in the second perspective of the VR scene, a first avatar of the first user of the first HMD, the first avatar appearing at a position and orientation within the second perspective of the VR scene corresponding to the first user's position and orientation relative to the second user in a real-world location; and
providing, in the first perspective of the VR scene, a second avatar of the second user of the second HMD, the second avatar appearing at a position and orientation within the first perspective of the VR scene corresponding to second user's position and orientation relative to the first user in the real-world location.

10. The computer-implemented method as recited in claim 9, further comprising:
tracking changes in real-world position and orientation of the first user of the first HMD and the second user of the second HMD;
mapping changes in the real-world position and orientation of the first user of the first HMD to the first avatar; and
mapping changes in the real-world position and orientation of the second user of the second HMD to the second avatar.

11. The computer-implemented method as recited in claim 9, further comprising:
tracking bodily movements of the first and second users in the real-world location;
mapping, respectively, the bodily movements of the first and second users to the first and second avatars.

12. The computer-implemented method as recited in claim 1, further comprising:
prompting the second user to move closer to the first user to place the second user proximate to a buffer zone, or to move further away from the first user to maintain a separation defined by the buffer zone.

13. A system for providing virtual reality (VR) scenes to one or more head mounted displays (HMD), comprising:
a first HMD configured to display VR scenes to a user;
a computing system capable of executing VR content, the executing of VR content producing a first perspective of a VR scene, the computing system being configured for establishing a first communication channel for providing the first perspective of the VR scene to the first HMD, and for establishing a second communication channel for receiving a signal from a second HMD, the signal including a request to join the VR scene, the second communication channel further used to provide a second perspective of the VR scene to the second HMD; and
a positioning system for tracking real-world position and orientation data and changes thereto of the first HMD and the second HMD, the real-world position and orientation data is usable to determine a relative location of the second HMD from the first HMD in a real-world space;
wherein the second perspective of the VR scene is based on the real-world position and orientation of the second HMD relative to that of the first HMD, the second perspective of the VR scene is shifted from the first perspective of the VR scene corresponding to a difference in the relative location of the second HMD from the first HMD in the real-world space, wherein the first perspective and the second perspective are controlled by respective position and orientation changes of the first and second HMDs, and wherein the user of the first HMD controls a progression of the VR scene and the progression causes a movement of the first perspective toward a direction within the VR scene, and said movement causes a corresponding movement toward the direction within the VR scene for the second perspective while substantially maintaining the shifted perspective between the first perspective and the second perspective.

14. The system as recited in claim 13, wherein the positioning system further comprises:
one or more image capture devices configured to capture images of the first and second HMDs, the image capture devices disposed to face at least partially toward the first and second HMDs, the images being analyzed to determine real-world position and orientation of the first and second HMDs.

15. The system as recited in claim 14, wherein the positioning system further includes one or more of inertial sensors disposed in the first HMD, the one or more inertial sensors configured to produce inertial data used to determine translational and rotational movement of the first HMD and the inertial data usable in combination with image capture device to track real-world position and orientation of the first HMD, the tracking including dead-reckoning.

16. The system as recited in claim 13, wherein the positioning system further comprises:
one or more sources of infrared (IR) light, the one or more sources of IR light configured to emanate IR light at least partially toward the first and second HMDs; and
a plurality of photo-sensitive diodes (PSDs) arrayed on a surface of the first HMD and the second HMD, the plurality of PSDs configured to detect the IR light;
wherein data from the one or more sources of IR light and the PSDs is used to determine a real-world position and orientation of the first and second HMDs.

17. A system for providing virtual reality (VR) scenes, comprising:
a first HMD configured to display a first perspective of a VR scene to a first user;
a mobile computing device associated with the first HMD usable for executing VR content, the executing of VR content producing the first perspective of the VR scene, the mobile computing device having a communication channel configured for exchanging data with a second HMD for determining a relative location of the second HMD from the first HMD in a real-world space and for enabling the second HMD to display a second perspective of the VR scene to a second user, the second perspective of the VR scene is shifted from the first perspective corresponding to a difference in the relative location of the second HMD from the first HMD in the real-world space, wherein the first user of the first HMD controls a progression of the VR scene and the progression causes a movement of the first perspective toward a direction within the VR scene, and said movement causes a corresponding movement toward the direction within the VR scene for the second perspective while substantially maintaining the shifted perspective between the first perspective and the second perspective; and
the mobile computing device including an inertial sensor for tracking real-world position and orientation of the first HMD, and the second perspective of the VR scene is based on real-world position and orientation of the second HMD relative to the first HMD.

18. The system as recited in claim 17, wherein the mobile computing device is operable to receive data on the position and orientation of the second HMD relative to the first HMD via the communication channel for said determining the relative location of the second HMD from the first HMD, the data on the position and orientation of the second HMD relative to the first HMD including inertial sensor data and image capture data and used to determine a real-world position and orientation of the second HMD relative to the first HMD.

19. The system as recited in claim 18, wherein the mobile computing device is further configured to send, via the communication channel, the determined real-world position and orientation of the second HMD relative to the first HMD usable to produce the second perspective of the VR scene for the second HMD.

20. The system as recited in claim 17, wherein the mobile computing device is one of a smart phone, a tablet, a laptop, or a netbook.

* * * * *